US012610050B2

(12) United States Patent
Dong et al.

(10) Patent No.: US 12,610,050 B2
(45) Date of Patent: Apr. 21, 2026

(54) MEDIA PACKETIZATION FOR NETWORK QUALITATIVE COMMUNICATION

(71) Applicant: Huawei Technologies Co., Ltd., Shenzhen (CN)

(72) Inventors: Lijun Dong, San Diego, CA (US); Vladyslav Zakharchenko, Sunnyvale, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 18/330,945

(22) Filed: Jun. 7, 2023

(65) Prior Publication Data

US 2023/0319279 A1     Oct. 5, 2023

Related U.S. Application Data

(63) Continuation of application No. PCT/US2020/063883, filed on Dec. 9, 2020.

(51) Int. Cl.
H04N 19/124          (2014.01)
G06T 9/00          (2006.01)
(Continued)

(52) U.S. Cl.
CPC ........... H04N 19/124 (2014.11); G06T 9/007 (2013.01); H04N 19/119 (2014.11);
(Continued)

(58) Field of Classification Search
CPC .... H04N 19/119; H04N 19/124; H04N 19/18; H04N 19/172; H04N 19/176;
(Continued)

(56) References Cited

U.S. PATENT DOCUMENTS 6,724,817 B1 *  4/2004  Simpson ................ H04N 19/18
                                                              375/E7.176
6,907,070 B2 *  6/2005  Wu ........................ H04N 19/34
                                                              375/240.12
(Continued)

FOREIGN PATENT DOCUMENTS

JP            5063678 B2 *  10/2012

OTHER PUBLICATIONS

Cheng, Albert Mo Kim, and Feng Shang. "Priority-driven coding and transmission of progressive jpeg images for real-time applications." The Journal of VLSI Signal Processing Systems for Signal, Image, and Video Technology 47.2: pp. 169-182. (Year: 2007).*

(Continued)

*Primary Examiner* — Scott A Rogers
(74) *Attorney, Agent, or Firm* — Conley Rose, P.C.

(57)          ABSTRACT

A media data coding mechanism is disclosed. The mechanism includes partitioning media data into a plurality of blocks. A transform is applied to the blocks to obtain a plurality of quantization coefficients. The quantization coefficients are sorted into quality layers of decreasing priority based on frequency, wherein each subsequent layer includes data to incrementally increase quality of a reconstructed media data. Quantization coefficients for all blocks are positioned in a media data packet according to quality layer in order of decreasing priority. The media data packet is stored.

20 Claims, 13 Drawing Sheets

(51) Int. Cl.

| | |
|---|---|
| *H04N 19/119* | (2014.01) |
| *H04N 19/172* | (2014.01) |
| *H04N 19/176* | (2014.01) |
| *H04N 19/18* | (2014.01) |
| *H04N 19/60* | (2014.01) |
| *H04N 19/625* | (2014.01) |
| *H04N 19/85* | (2014.01) |
| *H04N 19/88* | (2014.01) |

(52) U.S. Cl.
CPC ......... *H04N 19/172* (2014.11); *H04N 19/176* (2014.11); *H04N 19/18* (2014.11); *H04N 19/60* (2014.11); *H04N 19/625* (2014.11); *H04N 19/85* (2014.11); *H04N 19/88* (2014.11)

(58) Field of Classification Search
CPC ...... H04N 19/60; H04N 19/625; H04N 19/85; H04N 19/88; H04N 21/44008; G06T 9/00; G06T 9/007
See application file for complete search history.

(56) References Cited

U.S. PATENT DOCUMENTS

| | | | | |
|---|---|---|---|---|
| 7,580,578 | B1 | 8/2009 | Onno | |
| 7,974,341 | B2 * | 7/2011 | Chen | H04N 19/115 |
| | | | | 375/240.1 |
| 7,995,656 | B2 * | 8/2011 | Chen | H04N 19/44 |
| | | | | 375/240.26 |
| 8,265,140 | B2 * | 9/2012 | Mehrotra | H04N 19/34 |
| | | | | 375/240.22 |
| 9,036,711 | B1 * | 5/2015 | Sha | H04N 19/1887 |
| | | | | 375/240.23 |
| 12,273,539 | B2 * | 4/2025 | Dong | H04N 19/127 |
| 2007/0237240 | A1 * | 10/2007 | Lee | H04N 19/37 |
| | | | | 375/240.24 |
| 2010/0080290 | A1 | 4/2010 | Mehrotra | |
| 2012/0269060 | A1 | 10/2012 | Ji | |
| 2013/0022104 | A1 | 1/2013 | Chen | |
| 2024/0022733 | A1 * | 1/2024 | Dong | H04N 19/176 |

OTHER PUBLICATIONS

Dong, Lijun, and Richard Li. "Adaptive network coding based qualitative communication." 2022 25th Conference on Innovation in Clouds, Internet and Networks (ICIN). IEEE (Year: 2022).*
Han, James K., and George C. Polyzos. "Networking applications of the hierarchical mode of the JPEG standard." Conference Proceedings of the 1996 IEEE Fifteenth Annual International Phoenix Conference on Computers and Communications. IEEE (Year: 1996).*
Li, Richard, et al. "A framework for qualitative communications using big packet protocol." Proceedings of the ACM SIGCOMM 2019 Workshop on Networking for Emerging Applications and Technologies. (Year: 2019).*
Dong, Lijun, Lin Han, and Richard Li. "User-Oriented Qualitative Communication for JPEG/MPEG Packet Transmission." 2023 IEEE 31st International Conference on Network Protocols (ICNP). IEEE. (Year: 2023).*

* cited by examiner

100

200

Packet Wash

400
Quantization Coefficients
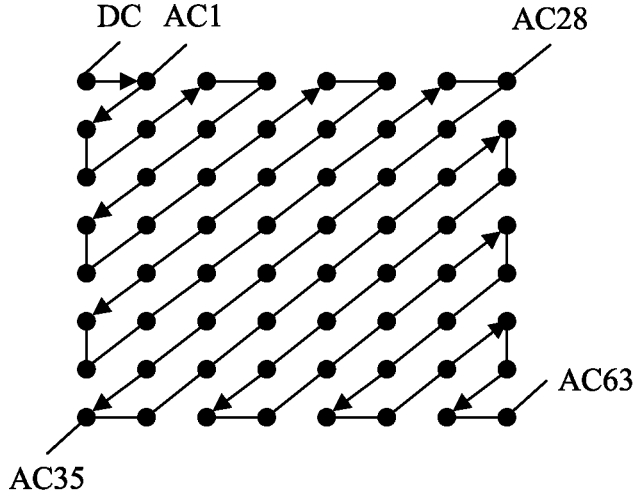
DC   AC1          AC28
AC63
AC35
FIG. 4
500
Layer 1    Layer 2    Layer 3       542
Layer 4
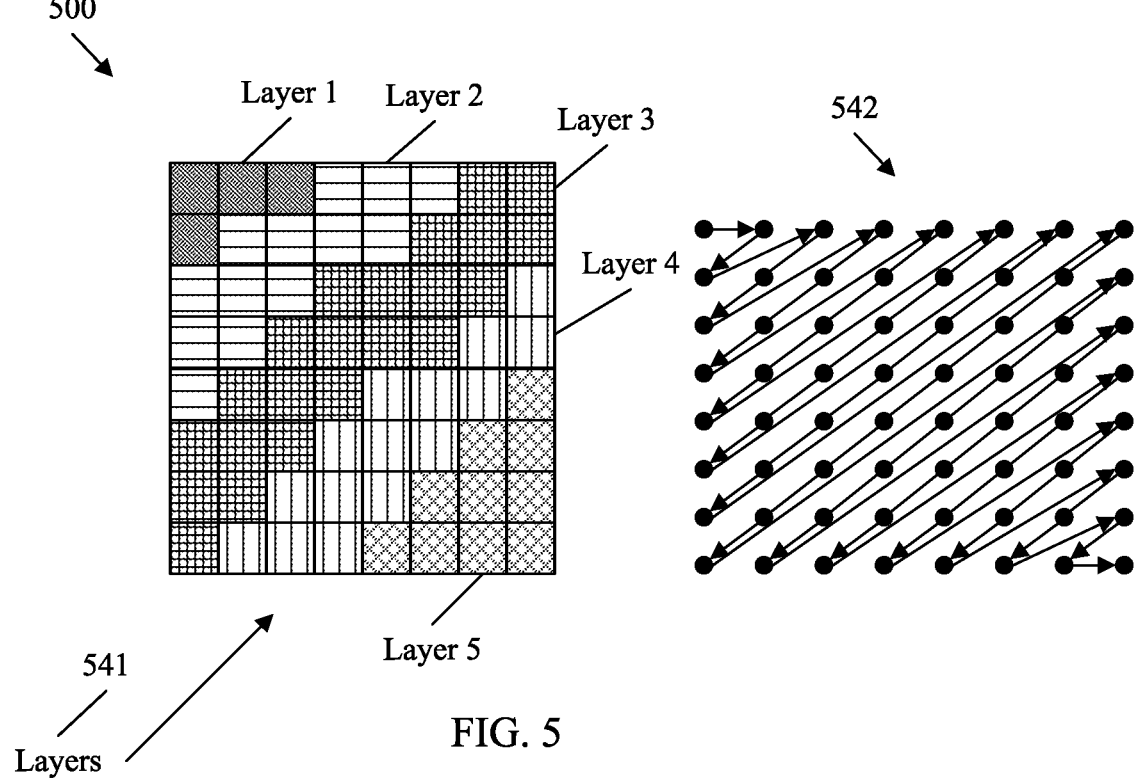
Layer 5
541
Layers
FIG. 5

600

643

Blocks

Block 1          Block 2          Block 3

Block 4

Block 5

Block 6

Chunks

645

641

Layers ⟶

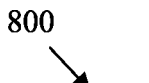
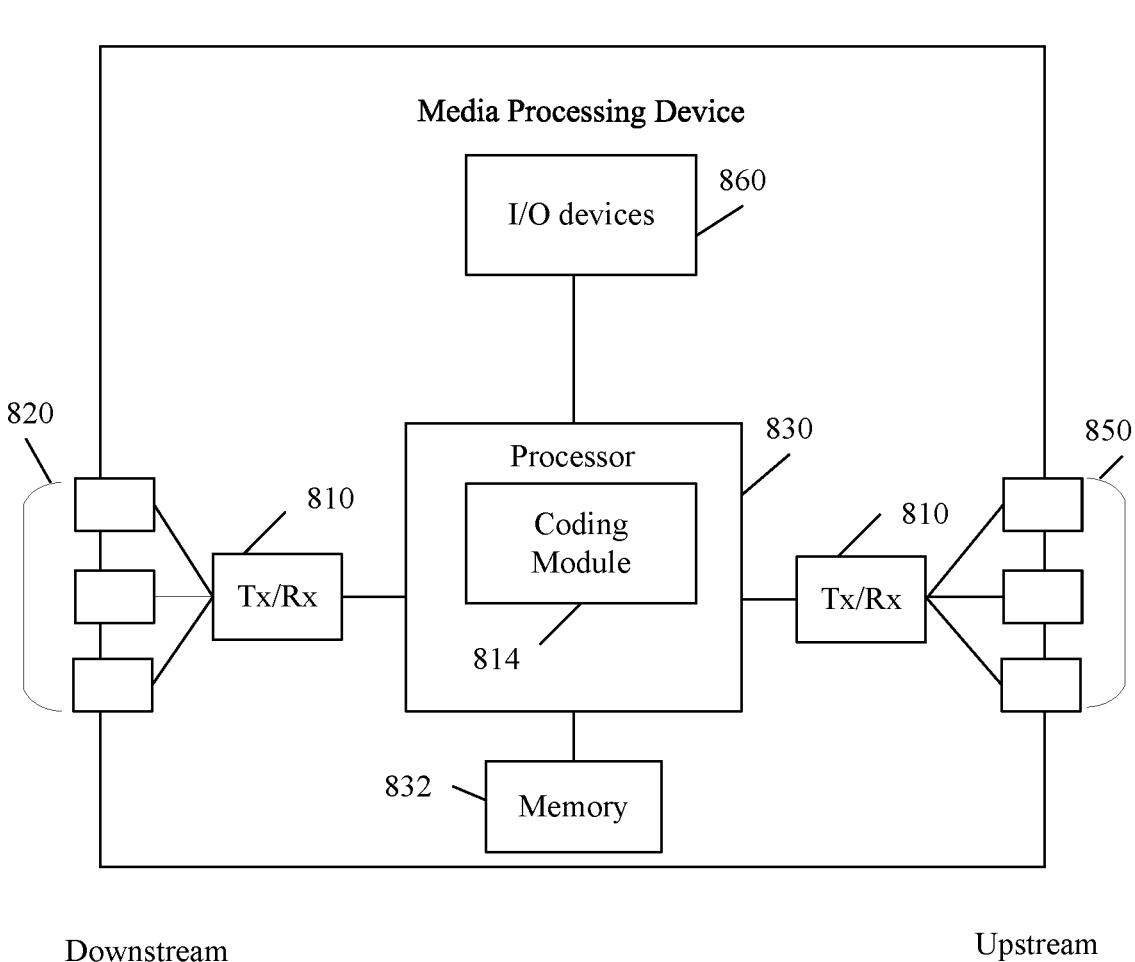
FIG. 8

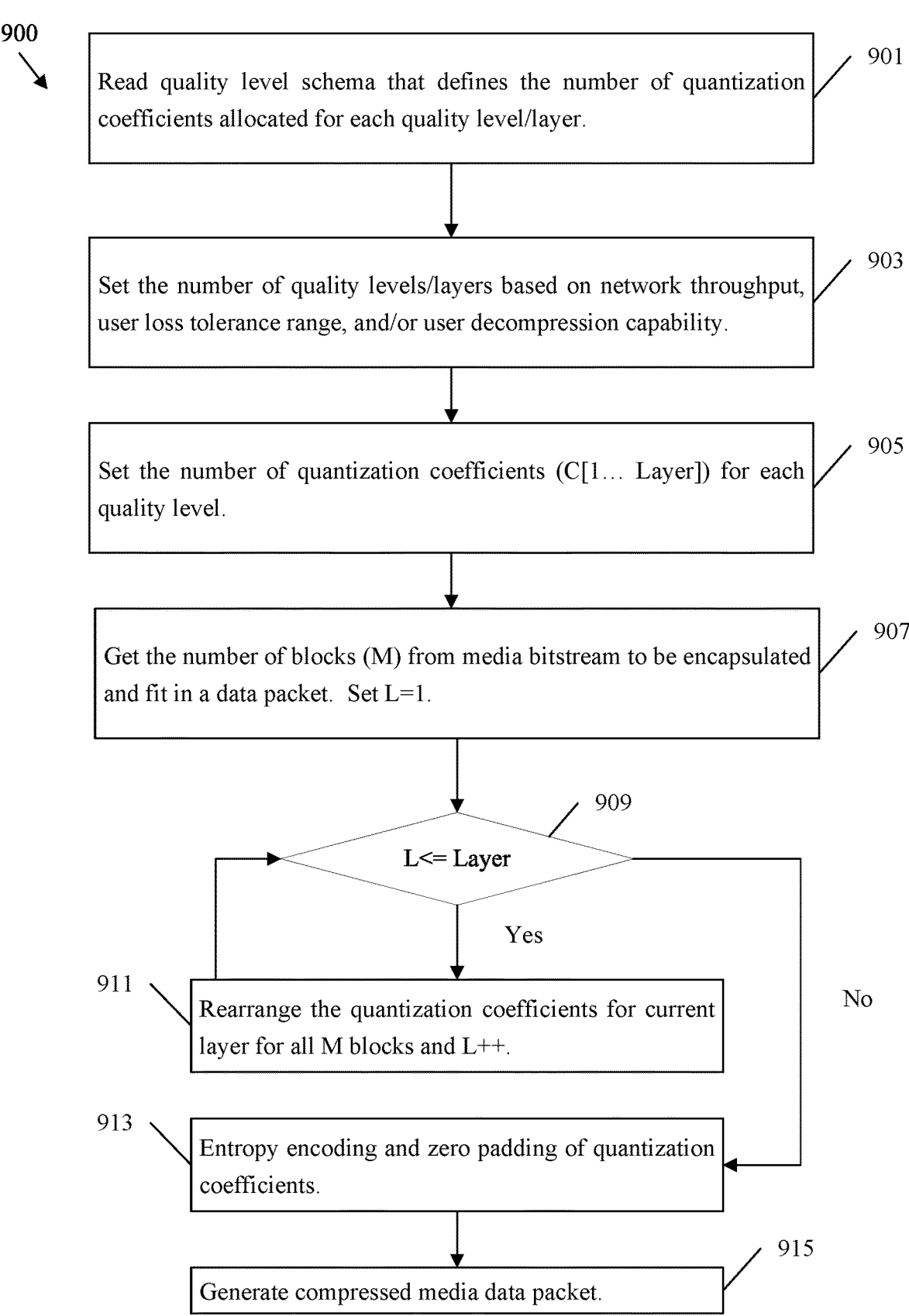

900

901
Read quality level schema that defines the number of quantization coefficients allocated for each quality level/layer.

903
Set the number of quality levels/layers based on network throughput, user loss tolerance range, and/or user decompression capability.

905
Set the number of quantization coefficients (C[1... Layer]) for each quality level.

907
Get the number of blocks (M) from media bitstream to be encapsulated and fit in a data packet. Set L=1.

909
L<= Layer

Yes

911
Rearrange the quantization coefficients for current layer for all M blocks and L++.

No

913
Entropy encoding and zero padding of quantization coefficients.

915
Generate compressed media data packet.

FIG. 9

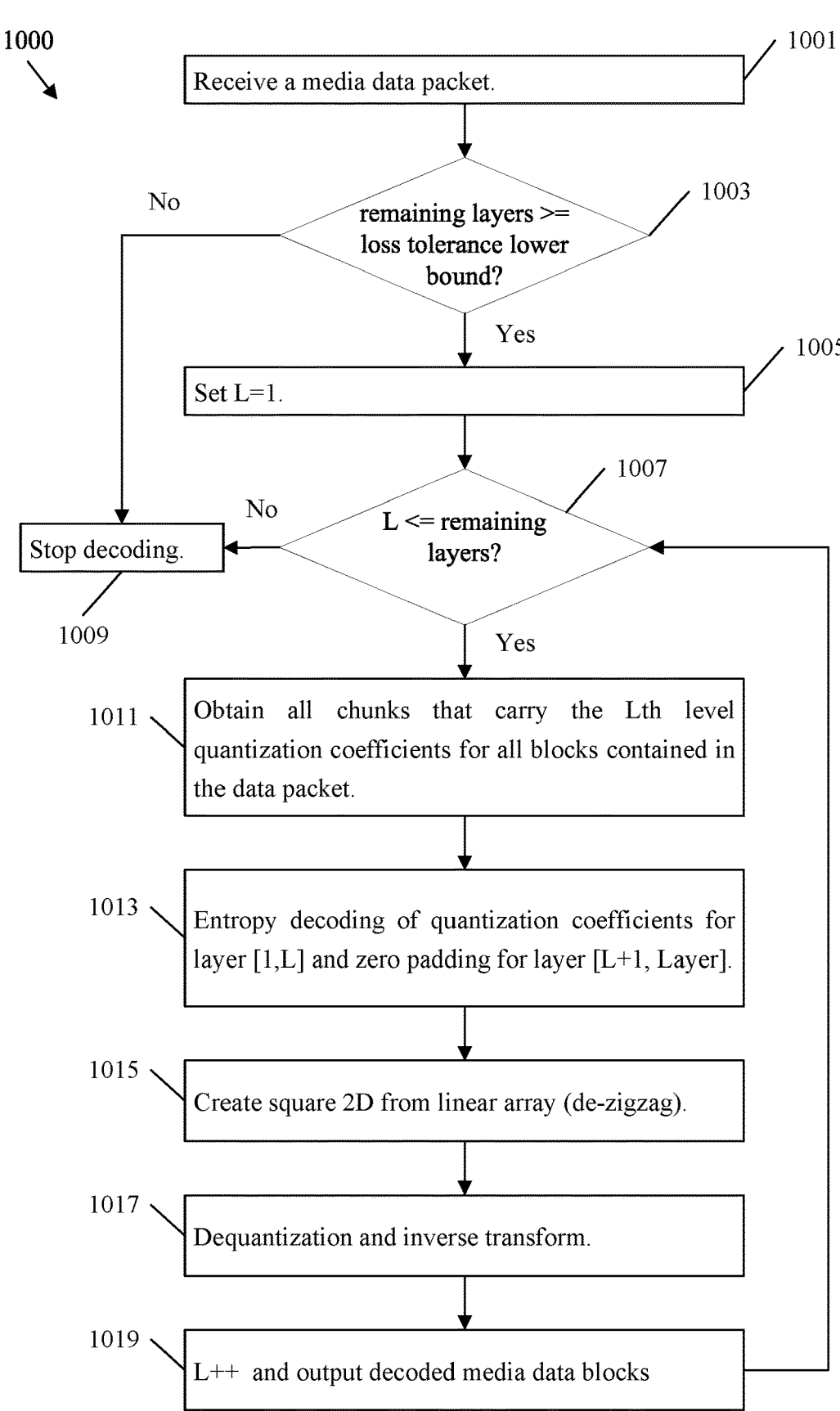

1000

1001 Receive a media data packet.

1003 remaining layers >= loss tolerance lower bound?

No

1005 Set L=1.

1007 L <= remaining layers?

No

1009 Stop decoding.

Yes

1011 Obtain all chunks that carry the Lth level quantization coefficients for all blocks contained in the data packet.

1013 Entropy decoding of quantization coefficients for layer [1,L] and zero padding for layer [L+1, Layer].

1015 Create square 2D from linear array (de-zigzag).

1017 Dequantization and inverse transform.

1019 L++ and output decoded media data blocks

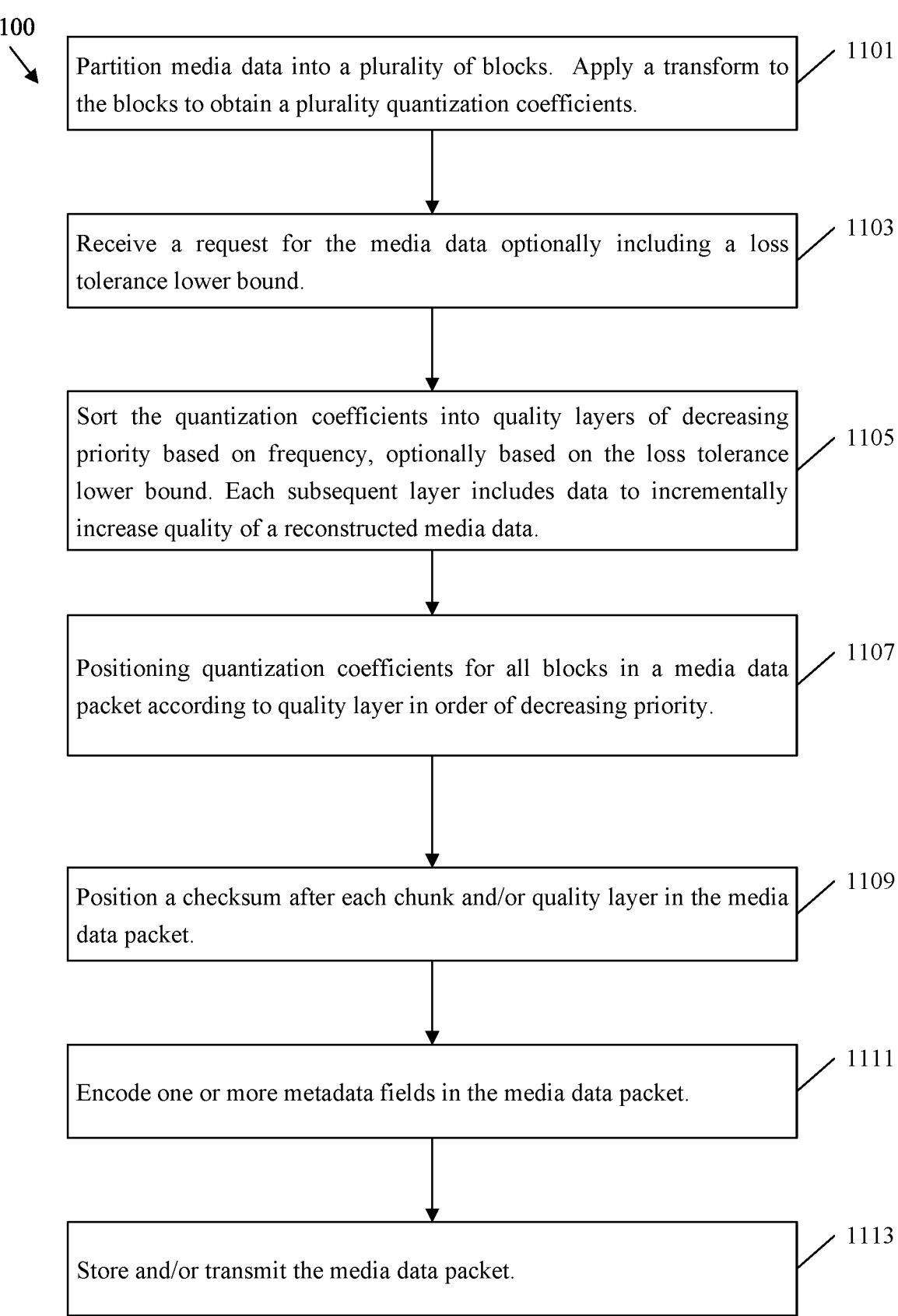

1101

Partition media data into a plurality of blocks. Apply a transform to the blocks to obtain a plurality quantization coefficients.

1103

Receive a request for the media data optionally including a loss tolerance lower bound.

1105

Sort the quantization coefficients into quality layers of decreasing priority based on frequency, optionally based on the loss tolerance lower bound. Each subsequent layer includes data to incrementally increase quality of a reconstructed media data.

1107

Positioning quantization coefficients for all blocks in a media data packet according to quality layer in order of decreasing priority.

1109

Position a checksum after each chunk and/or quality layer in the media data packet.

1111

Encode one or more metadata fields in the media data packet.

1113

Store and/or transmit the media data packet.

Receive a media data packet for media data containing a plurality of blocks, the media data packet. The media data packet comprises quantization coefficients for all blocks. The quantization coefficients are positioned in quality layers of decreasing priority based on frequency. Each subsequent layer includes data to incrementally increase quality of a reconstructed media data.     1201

Determine a loss tolerance lower bound from the media data packet.     1203

Determine a current bandwidth availability.     1205

Incrementally dropping each least significant quality layer of the media data packet until the current bandwidth availability is reached.     1207

Transmit the media data packet when the loss tolerance lower bound is met.     1209

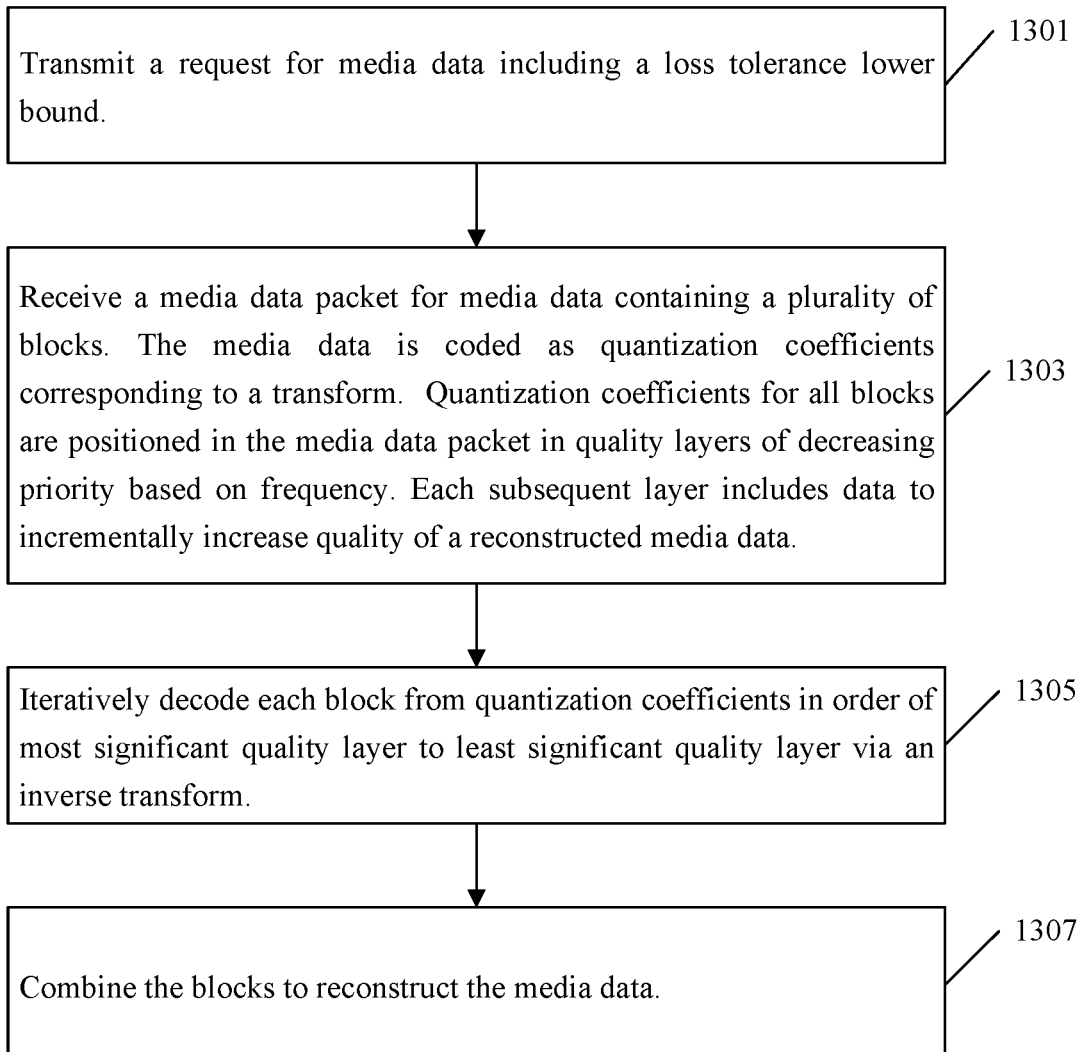

Transmit a request for media data including a loss tolerance lower bound.    1301

Receive a media data packet for media data containing a plurality of blocks. The media data is coded as quantization coefficients corresponding to a transform. Quantization coefficients for all blocks are positioned in the media data packet in quality layers of decreasing priority based on frequency. Each subsequent layer includes data to incrementally increase quality of a reconstructed media data.    1303

Iteratively decode each block from quantization coefficients in order of most significant quality layer to least significant quality layer via an inverse transform.    1305

Combine the blocks to reconstruct the media data.    1307

FIG. 13

MEDIA PACKETIZATION FOR NETWORK QUALITATIVE COMMUNICATION

CROSS-REFERENCE TO RELATED APPLICATIONS

This patent application is a continuation of International Application No. PCT/US2020/063883, filed Dec. 9, 2020 by Lijun Dong, et al., and titled "Media Packetization For Network Qualitative Communication," which is hereby incorporated by reference.

TECHNICAL FIELD

The present disclosure is generally related to media data coding, and is specifically related to mechanisms for coding media data to allow a transmission network to dynamically reduce quality to support transmission in the presence of network congestion.

BACKGROUND

Joint photographic experts group (JPEG) is a file format and a common mechanism for compressing an image. JPEG employs a lossy compression, which means that the image is compressed in a manner that allows the image to be decompressed with a predetermined amount of data loss. The degree of compression can be adjusted at the time of encoding to allow for a selectable tradeoff between the data size of the image and image quality. However, once the encoding is complete, the data size of the image is fixed. The JPEG can be sent to a user. However, networks are often highly dynamic and variable environments. Further, image transfers are often low priority communications. As such, data packets containing JPEGs may be dropped in transit when sudden congestion occurs in the network. This allows higher priority traffic to be managed. The static size of JPEGs after encoding may not support actions that are responsive to changes in network status. As such, a dropped packet containing a JPEG may only be remedied in most systems by requesting that the packet be resent.

SUMMARY

In an embodiment, the disclosure includes a method implemented by an encoder, the method comprising: partitioning, by a processor of the encoder, media data into a plurality of blocks; applying, by the processor, a transform to the blocks to obtain a plurality of quantization coefficients; sorting, by the processor, the quantization coefficients into quality layers of decreasing priority based on frequency, wherein each subsequent layer includes data to incrementally increase quality of a reconstructed media data; positioning, by the processor, quantization coefficients for all blocks in a media data packet by quality layer in order of decreasing priority; and storing, by a memory of the encoder, the media data packet.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such a packet wash operation. Specifically, media may be compressed to a predetermined size at the time of encoding. For example, the compressed data may be arranged by blocks and not by priority at the time of encoding. Accordingly, a packet wash operation may not be directly applied to a media data packet as the packet wash may be unable to determine which chunk can be discarded and which chunk should be maintained.

The present example includes a mechanism for applying a packet wash to a media data packet so that the media data packet can be reduced in size as desired to avoid a complete packet drop. In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. This allows a requestor to receive requested media at a lower quality in case of network congestion instead of receiving nothing due to a complete packet drop. This mechanism may provide a better user experience. Further, this mechanism may prevent the user from requesting the entire media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the quality layers are positioned to support incremental partial drops of each least significant quality layer from the media data packet during transmission while retaining one or more most significant layers.

Optionally, in any of the preceding aspects, another implementation of the aspect provides, wherein the quantization coefficients are further sorted into chunks, wherein each chunk includes all quantization coefficients for a corresponding block at a corresponding quality layer, and wherein chunks corresponding to a plurality of blocks at a same quality layer are included in adjacent positions in the media data packet.

Optionally, in any of the preceding aspects, another implementation of the aspect provides, further comprising positioning, by the processor, a checksum after each quality layer in the media data packet.

Optionally, in any of the preceding aspects, another implementation of the aspect provides, further comprising positioning, by the processor, a checksum after each chunk in the media data packet.

Optionally, in any of the preceding aspects, another implementation of the aspect provides, further comprising receiving, by a receiver of the encoder, a request for the media data, wherein the request includes a loss tolerance lower bound, and wherein the quantization coefficients are sorted into quality layers based on the loss tolerance lower bound or decoder decoding capabilities.

Optionally, in any of the preceding aspects, another implementation of the aspect provides, further comprising encoding, by the processor, one or more metadata fields in the media data packet, wherein the metadata fields include a number of blocks in the media data, a number of quality layers, a size of each layer, a loss tolerance lower bound, a number of remaining layers, or combinations thereof.

In an embodiment, the disclosure includes a method implemented by a decoder, the method comprising: receiving, by a receiver of the decoder, a media data packet for media data containing a plurality of blocks, wherein the media data is coded as quantization coefficients corresponding to a transform, wherein the quantization coefficients for all blocks are positioned in the media data packet in quality layers of decreasing priority based on frequency, and wherein each subsequent layer includes data to incrementally increase quality of a reconstructed media data; iteratively decoding, by a processor of the decoder, each block from the quantization coefficients in order of most significant quality layer to least significant quality layer via an inverse transform; and combining, by the processor, the blocks to reconstruct the media data.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such a packet wash operation. Specifically, media may be compressed to a predetermined size at the time of encoding. For example, the compressed data may be arranged by blocks and not by priority at the time of encoding. Accordingly, a packet wash operation may not be directly applied to a media data packet as the packet wash may be unable to determine which chunk can be discarded and which chunk should be maintained.

The present example includes a mechanism for applying a packet wash to a media data packet so that the media data packet can be reduced in size as desired to avoid a complete packet drop. In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. This allows a requestor to receive requested media at a lower quality in case of network congestion instead of receiving nothing due to a complete packet drop. This mechanism may provide a better user experience. Further, this mechanism may prevent the user from requesting the entire media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the quality layers are positioned to support incremental partial drops of each least significant quality layer from the media data packet during transmission while retaining one or more most significant layers.

Optionally, in any of the preceding aspects, another implementation of the aspect provides, wherein the quantization coefficients are further sorted into chunks, wherein each chunk includes all quantization coefficients for a corresponding block at a corresponding quality layer, and wherein chunks corresponding to a plurality of blocks at a same quality layer are included in adjacent positions in the media data packet.

Optionally, in any of the preceding aspects, another implementation of the aspect provides, wherein a checksum is positioned after each quality layer in the media data packet.

Optionally, in any of the preceding aspects, another implementation of the aspect provides, wherein a checksum is positioned after each chunk in the media data packet.

Optionally, in any of the preceding aspects, another implementation of the aspect provides, further comprising transmitting, by a transmitter of the decoder, a request for the media data prior to receiving the media data packet, wherein the request includes a loss tolerance lower bound, and wherein the quantization coefficients are sorted into quality layers in the media data packet based on the loss tolerance lower bound in the request.

Optionally, in any of the preceding aspects, another implementation of the aspect provides, wherein the media data packet includes one or more metadata fields, wherein the metadata fields include a number of blocks in the media data, a number of quality layers, a size of each layer, a loss tolerance lower bound, a number of remaining layers, or combinations thereof, and wherein each block is iteratively decoded based on data in the metadata fields.

In an embodiment, the disclosure includes a method implemented by a network node, the method comprising: receiving, by a receiver of the network node, a media data packet for media data containing a plurality of blocks, the media data packet comprising quantization coefficients for all blocks, wherein the quantization coefficients are positioned in quality layers of decreasing priority based on frequency, and wherein each subsequent layer includes data to incrementally increase quality of a reconstructed media data; determining, by a processor of the network node, a loss tolerance lower bound from the media data packet; determining, by the processor, an outgoing buffer availability; incrementally dropping, by the processor, each least significant quality layer of the media data packet until the outgoing buffer availability is reached; and transmitting, by a transmitter of the network node, the media data packet when the loss tolerance lower bound is met.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such a packet wash operation. Specifically, media may be compressed to a predetermined size at the time of encoding. For example, the compressed data may be arranged by blocks and not by priority at the time of encoding. Accordingly, a packet wash operation may not be directly applied to a media data packet as the packet wash may be unable to determine which chunk can be discarded and which chunk should be maintained.

The present example includes a mechanism for applying a packet wash to a media data packet so that the media data packet can be reduced in size as desired to avoid a complete packet drop. In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. This allows a requestor to receive requested media at a lower quality in case of network congestion instead of receiving nothing due to a complete packet drop. This mechanism may provide a better user experience. Further, this mechanism may prevent the user from requesting the entire media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein incrementally dropping each least significant quality layer includes removing quantization coefficients from an end of the payload of the media data packet.

Optionally, in any of the preceding aspects, another implementation of the aspect provides, wherein the quantization coefficients are sorted into chunks, wherein each chunk includes all quantization coefficients for a corresponding block at a corresponding quality layer, and wherein chunks corresponding to a plurality of blocks at a same quality layer are included in adjacent positions in the media data packet.

Optionally, in any of the preceding aspects, another implementation of the aspect provides, wherein a checksum is positioned after each quality layer in the media data packet, and wherein incrementally dropping each least significant quality layer includes incrementally dropping each last quality layer in the media data packet until the outgoing buffer availability is reached.

Optionally, in any of the preceding aspects, another implementation of the aspect provides, wherein a checksum is positioned after each chunk in the media data packet, and wherein incrementally dropping each least significant quality layer includes incrementally dropping each last chunk in the media data packet until the outgoing buffer availability is reached.

Optionally, in any of the preceding aspects, another implementation of the aspect provides, wherein the media data packet includes one or more metadata fields including a number of remaining layers, and further comprising decrementing, by the processor, the number of remaining layers each time a quality layer is dropped.

Optionally, in any of the preceding aspects, another implementation of the aspect provides, wherein the metadata fields further include a number of blocks in the media data, a number of quality layers, a size of each layer, the loss tolerance lower bound, or combinations thereof.

In an embodiment, the disclosure includes a media processing device, comprising: a processor, a receiver coupled to the processor, a memory coupled to the processor, and a transmitter coupled to the processor, wherein the processor, the receiver, the memory, and the transmitter are configured to perform the method of any of the preceding aspects.

In an embodiment, the disclosure includes a non-transitory computer readable medium comprising a computer program product for use by a media processing device, the computer program product comprising computer executable instructions stored on the non-transitory computer readable medium such that when executed by a processor cause the coding device to perform the method of any of the preceding aspects.

In an embodiment, the disclosure includes a network device, comprising: a processor, a receiver coupled to the processor, a memory coupled to the processor, and a transmitter coupled to the processor, wherein the processor, the receiver, the memory, and the transmitter are configured to perform the method of any of the preceding aspects.

In an embodiment, the disclosure includes a non-transitory computer readable medium comprising a computer program product for use by a network device, the computer program product comprising computer executable instructions stored on the non-transitory computer readable medium such that when executed by a processor cause the media processing device to perform the method of any of the preceding aspects.

In an embodiment, the disclosure includes an encoder, comprising: a partitioning means for partitioning media data into a plurality of blocks; an application means for applying a transform to the blocks to obtain a plurality of quantization coefficients; a sorting means for sorting the quantization coefficients into quality layers of decreasing priority based on frequency, wherein each subsequent layer includes data to incrementally increase quality of a reconstructed media data; a positioning means for positioning quantization coefficients for all blocks in a media data packet by quality layer in order of decreasing priority; and a storing means for storing the media data packet.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such a packet wash operation. Specifically, media may be compressed to a predetermined size at the time of encoding. For example, the compressed data may be arranged by blocks and not by priority at the time of encoding. Accordingly, a packet wash operation may not be directly applied to a media data packet as the packet wash may be unable to determine which chunk can be discarded and which chunk should be maintained.

The present example includes a mechanism for applying a packet wash to a media data packet so that the media data packet can be reduced in size as desired to avoid a complete packet drop. In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. This allows a requestor to receive requested media at a lower quality in case of network congestion instead of receiving nothing due to a complete packet drop. This mechanism may provide a better user experience. Further, this mechanism may prevent the user from requesting the entire media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the encoder is further configured to perform the method of any of the preceding aspects.

In an embodiment, the disclosure includes a decoder, comprising: a receiving means for receiving a media data packet for media data containing a plurality of blocks, wherein the media data is coded as quantization coefficients corresponding to a transform, wherein the quantization coefficients for all blocks are positioned in the media data packet in quality layers of decreasing priority based on frequency, and wherein each subsequent layer includes data to incrementally increase quality of a reconstructed media data; and a decoding means for: iteratively decoding each block from quantization coefficients in order of most significant quality layer to least significant quality layer via an inverse transform; and combining the blocks to reconstruct the media data.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such a packet wash operation. Specifically, media may be compressed to a predetermined size at the time of encoding. For example, the compressed data may be arranged by blocks and not by priority at the time of encoding. Accordingly, a packet wash operation may not be directly applied to a media data packet as the packet wash may be unable to determine which chunk can be discarded and which chunk should be maintained.

The present example includes a mechanism for applying a packet wash to a media data packet so that the media data packet can be reduced in size as desired to avoid a complete packet drop. In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. This allows a requestor to receive requested media at a lower quality in case of network congestion instead of receiving nothing due to a complete packet drop. This mechanism may provide a better user experience. Further, this mechanism may prevent the user from requesting the entire media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the decoder is further configured to perform the method of any of the preceding aspects.

In an embodiment, the disclosure includes a network node, comprising: a receiving means for receiving a media data packet for media data containing a plurality of blocks, the media data packet comprising quantization coefficients for all blocks, wherein the quantization coefficients are positioned in quality layers of decreasing priority based on frequency, and wherein each subsequent layer includes data to incrementally increase quality of a reconstructed media data; a determining means for: determining a loss tolerance lower bound from the media data packet; determining an outgoing buffer availability; a dropping means for incrementally dropping each least significant quality layer of the media data packet until the outgoing buffer availability is reached; and a transmitting means for transmitting the media data packet when the loss tolerance lower bound is met.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such a packet wash operation. Specifically, media may be compressed to a predetermined size at the time of encoding. For example, the compressed data may be arranged by blocks and not by priority at the time of encoding. Accordingly, a packet wash operation may not be directly applied to a media data packet as the packet wash may be unable to determine which chunk can be discarded and which chunk should be maintained.

The present example includes a mechanism for applying a packet wash to a media data packet so that the media data can be reduced in size as desired to avoid a complete packet drop. In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. This allows a requestor to receive requested media at a lower quality in case of network congestion instead of receiving nothing due to a complete packet drop. This mechanism may provide a better user experience. Further, this mechanism may prevent the user from requesting the entire media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the network node is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram illustrating an example set of quantization coefficients generated to represent a block of an image.

FIG. 5 is a schematic diagram illustrating an example mechanism for grouping quantization coefficients for a block into layers based on corresponding effects on image quality.

FIG. 8 is a schematic diagram of an example media processing device.

FIG. 9 is a flowchart of an example method of encoding media data to support qualitative communication.

FIG. 10 is a flowchart of an example method of decoding media data processed by qualitative communication.

FIG. 11 is a flowchart of another example method of encoding media data to support qualitative communication.

FIG. 12 is a flowchart of an example method of applying qualitative communication to a media data packet.

FIG. 13 is a flowchart of another example method of decoding media data processed by qualitative communication.

DETAILED DESCRIPTION

Figure 1:
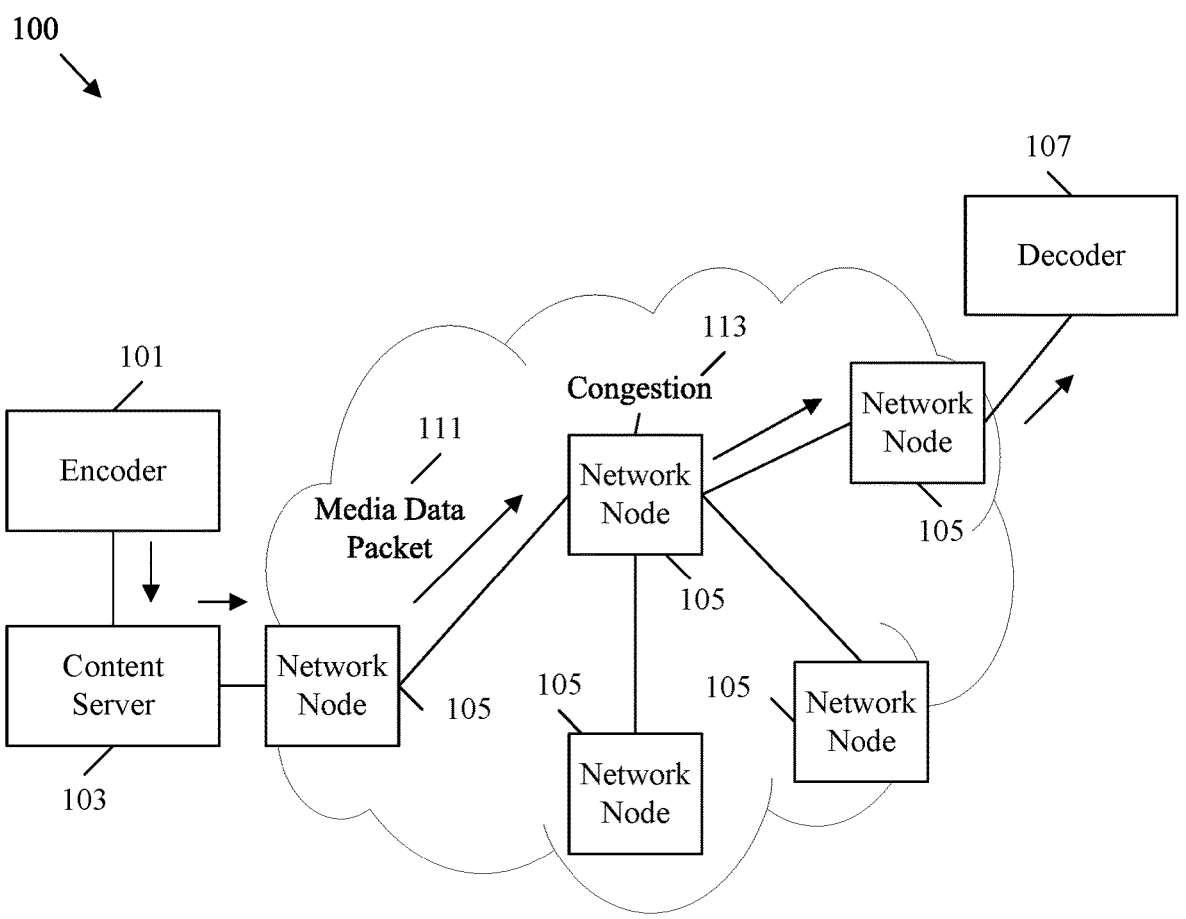
FIG. 1 is a schematic diagram of an example network configured to perform qualitative communication.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

An encoder is any device capable of converting raw media data into a compressed for storage and/or transmission toward a decoder. Any such transmission may involve intermediate storage on a content server, which is a network device capable of storing data until such data is requested from an end user via a decoder. A decoder is any device capable of converting a compressed media data file into a raw media data, for example for display/playback to an end user. For example, a decoder may include any device that contains a web browser. A network node/device is any network device capable of receiving, handling, and/or transmitting a packet containing compressed media data. Media data is data describing any form of media that can be displayed and/or played back for a user, such as an image, video, audio, etc. A block is a grouping of samples (e.g., color and/or light values in an image, audio levels in a sound file, etc.) of a predetermined size to support compression and/or decompression mechanisms. A transform is any mechanism for consistently converting data into another form. For example, discrete cosine transform (DCT) is a transform that expresses a finite sequence of data points in terms of a sum of cosine functions at different frequencies. A frequency is a number of occurrences of a repeating event per a unit of time and/or distance. A quantization coefficient is a horizontal and/or vertical frequency component that partially describes a sequence of data points in a transformed frequency domain. A quality layer is a grouping of quantization coefficients based on similarity of frequency and resulting effect on decompressed image quality. A chunk is a set of quantization coefficients that are included in a single block and in a single quality layer. A most significant quality layer is a layer of quantization coefficients and/or chunks thereof that has a greatest effect on decompressed media quality. A least significant quality layer is a layer of quantization coefficients and/or chunks thereof that has a least effect on decompressed media quality. Media quality describes an amount of data loss (or lack thereof) when reconstructing media compressed according to a lossy compression process. A priority is an indication of a level of importance for a corresponding item relative to other items. The least significant quality layer for a media data packet may change when a previously least significant quality layer is discarded.

A media data packet is any network packet that contains compressed data representing media, such as an image, video, audio, etc. A checksum is a small sized portion of data derived from a block of digital data for the purpose of detecting errors occurring during transmission and/or storage. A loss tolerance lower bound is data indicating an amount of data loss (e.g., minimum quality level) that a requestor is willing to accept. A metadata field is a field of data in a packet that provides information about other data (e.g., in the same packet). A layer size is data indicating a number of quantization coefficients included in a corresponding layer. A number of remaining layers is data indicating a number of layers retained in a packet by taking into account any layers that have been dropped, for example to reduce packet size to allow for transmission in light of network congestion. An outgoing buffer availability is data indicating an amount of buffer space currently available for storing a packet at a corresponding network node until the packet can be transmitted. A packet drop is a mechanism for purposely discarding a packet during transmission through a network when relevant network resources are insufficient to respond to all demands placed on such network resources. A partial packet drop is a mechanism for dropping portions of a packet in order to allow a remainder of a packet to be transmitted when relevant network resources are insufficient to transmit the entire packet.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Compressed media is not designed to be compatible with such packet wash operation. Specifically, media may be compressed to a predetermined size at the time of encoding. For example, the encoding mechanism may arrange the compressed media data based on correlations between the data and not based on a priority. As a specific example, a JPEG can be partitioned into blocks and compressed by applying a transform to each of the blocks. However, the resulting data is arranged by block and not by priority. Accordingly, a packet wash operation may not be directly applied to a media data packet as the packet wash may be unable to determine which chunk can be discarded and which chunk should be maintained.

Disclosed herein is a mechanism for applying a packet wash to a media data packet so that the media data packet can be reduced in size as desired to avoid a complete packet drop. A media data packet may include any type of media compressed by a transform. As a particular example, a media data packet may contain a JPEG compressed by employing a discrete cosine transform (DCT). In order to accomplish this mechanism, the compressed data in a media data packet is rearranged in order of priority. Specifically, the media data is partitioned into blocks. A transform is applied to each block which represents each block of the media data as a series of quantization coefficients. The quantization coefficients are included in quality layers based on the effect such quantization coefficients have on the reconstructed media. For example, a DCT can be applied to a JPEG to create a matrix of quantization coefficients. The quantization coefficients on the top left of the matrix have the greatest effect on image quality and the quantization coefficients on the bottom right have the least effect on image quality. Once the quantization coefficients are included in quality layers, the quantization coefficients can be included in a media packet in order of quality layers instead of in the order of the blocks that are associated with the quantization coefficients. The result is a packet with the highest quality layers at the start of the packet and the lowest quality layers at the end of the packet. A network node can then perform a packet wash by removing chunks and/or quality layers from the end of the packet. The most important quantization coefficients are thereby preserved. Accordingly, the media data packet is arranged to allow for dynamic reduction in quality of the media data as part of a packet wash operation. Stated differently, sorting quantization coefficients into layers allows a network node to dynamically perform a form of quantization on a media data packet in response to congestion instead of requiring that quantization occur at an encoder prior to encoding. This allows a requestor to receive requested media at a lower quality in case of network congestion instead of receiving nothing due to a complete packet drop. This mechanism may provide a better user experience. Further, this mechanism may prevent the user from requesting the media data packet to be resent, which would otherwise create additional network congestion and latency. As such, the present mechanism creates additional functionality and reduces processor, memory, and/or network resource usage by an encoder, a content server, a decoder, and/or an intermediate network node in a communication network.

FIG. 1 is a schematic diagram of an example network 100 configured to perform qualitative communication. The network 100 includes an encoder 101, a content server 103, a decoder 107, and a group of interconnected network nodes 105.

An encoder 101 is any computing device capable of converting raw media data into a compressed format for storage and/or transmission toward a decoder. For example, an encoder 101 may be configured to compress video, audio, and/or images into a compressed format for transmission over network 100. The encoder 101 can use a lossy or a lossless compression algorithm. A lossy compression that reduces size, but loses data. A lossless compression algorithm loses no data to the compression process. As a result, reconstructed media data compressed by a lossless compression algorithm is identical to the original media file, while reconstructed media data compressed by a lossy compression algorithm approximates the original media file. As a specific example, an encoder 101 can apply a transform, such as a DCT, to media data, such as a JPEG, to create a series of quantization coefficients at various frequencies. These quantization coefficients can be included in a media data packet 111 for transmission toward a decoder 107 for reconstruction into the original media data. Use of a transform, such as DCT, for compression is a lossy algorithm that approximates the original data. The amount of lost data depends on the number of quantization coefficients employed, with fewer quantization coefficients resulting in more lost data. It should be noted that a small amount of lost data may be imperceptible to a human observer, while a large amount of lost data may be clearly perceived by the end user. As such, the encoder 101 may be configured to employ a number of quantization coefficients that balances processor, memory, and/or network resources with expected user sensitivity to data loss.

A content server 103 is a computing device capable of storing data and making such data available to other network devices upon request. For example, a content server 103 may receive compressed media data and/or media data packets 111 from an encoder and store such data until such data is requested by a decoder 107. For example, a prerecorded video, image, and/or audio file (e.g., in a web page and/or web-based software) may be stored in the content server 103. The content server 103 may transmit a media data packet 111 containing such data to a decoder 107 upon request. A content server 103 is optional equipment. For example, an encoder 101 that live streams content may transmit such content directly to a decoder 107. As a specific example, an encoder 101 being used as part of a teleconference may transmit media data packets 111 to the decoder 107 in real time without employing a content server 103. When used, the content server 103 stores compressed media data, receives a request for media data, and transmits a media data packet 111 on behalf of the encoder 101.

A decoder 107 is any computing device capable of converting a compressed media data file into a raw media data, for example for display/playback to an end user. For example, a decoder 107 may include any device that contains a web browser. The decoder 107 is configured to request media data from the encoder 101 and/or the content server 103 via network nodes 105. The decoder 107 can then receive the media data packet 111 (or multiple media data packets 111) containing the requested media data, decode the media data packet 111 to reconstruct the media data, and display and/or play back the media data to a user. For example, the media data played back for the user may include static image(s), such as JPEGs, video including multiple images, synchronized audio, or combinations thereof. During reconstruction, the decoder 107 can obtain quantization coefficients from the media data packet 111. The decoder 107 can also employ an inverse transform, such as an inverse DCT, to reconstruct the media data, with any associated compression losses, from the media data packet 111.

The media data packet 111 is any network packet that contains compressed data representing media, such as an image, video, audio, etc. In the event a transform is used to compress the media data, the media data packet 111 comprises quantization coefficients that represent media data in a compressed form. The media data packet 111 may also include headers, checksums, and/or metadata. Hence, the media data packet 111 contains media data, data describing the media data, data describing how the media data packet 111 should be handled, data used for error checking, etc.

The media data packet 111 and any associated requests are communicated between the encoder 101, the decoder 107, and/or the content server 103 via a network of network nodes 105. A network node 105 is any network device capable of receiving, handling, and/or transmitting a packet containing compressed media data, such as media data packet 111. As a specific example, the network nodes 105 are configured to transmit a request for media data from the encoder 101 to the content server 103 and/or decoder 107. Further, the network nodes 105 are configured to transmit the media data packet 111 from the encoder 101 and/or content server 103 to the decoder 107.

The network nodes 105 may communicate many flows of data simultaneously. In some cases, an overloaded network node 105 may experience congestion 113. Congestion 113 describes a scenario where a network node 105 or associated link is directed to communicate more network traffic than is supported by the associated hardware. For example, congestion 113 may occur when a network node 105 begins receiving traffic faster than the network node 105 can process that traffic. Congestion 113 can also occur when the network node 105 is directed to transmit more data over a specified output port and/or link than a maximum bandwidth capacity of the output port and/or link. A network node 105 can manage congestion 113 by storing packets until additional bandwidth is available. However, memory on a network node 105 is a finite resource and can become overloaded if the congestion 113 becomes severe and/or is consistent over an extended period. Once the network node 105 exceeds both communication bandwidth and memory capacity, the network node 105 may be forced to begin dropping packets. A packet drop is a mechanism for purposely discarding a packet during transmission through a network when relevant network resources are insufficient to respond to all demands placed on such network resources.

In some networks, packet drops result in data becoming lost. However, network 100 is configured to employ network qualitative communication. Network qualitative communication is a network paradigm configured to mitigate data loss in a network 100 due to network congestion 113. In a network 100 configured for network qualitative communication, network nodes 105 are configured to perform a packet wash operation. A packet wash is performed when a packet would otherwise be dropped due to network congestion 113. Instead of dropping the entire packet, the packet wash removes portions of the packet called chunks. This has the effect of reducing the size of the packet until that packet is small enough to be stored and/or transmitted by the network node 105 in spite of the congestion 113. The chunks of the packets can be arranged in order of priority so that the most important information is preserved while the least important information is discarded during the packet wash operation. As a result, the most important information in a packet may still be successfully transmitted through the network 100 instead of being dropped.

Further, network 100 is configured to employ network qualitative communication principles when transmitting media data packet 111. Other networks are unable to perform a packet wash on a media data packet because the quality, and hence the size, of a media data packet is set when the media data is encoded/compressed. Specifically, the media data is partitioned into blocks and compressed by a transform resulting in a group of quantization coefficients for each block. Other networks organize compressed media data by positioning all quantization coefficients corresponding to a block in adjacent positions in a packet. As such, quantization coefficients are indistinguishable from a priority standpoint, and hence are either all dropped or all transmitted.

Network 100 is altered to address this problem. The encoder 101 and/or content server 103 can organize quantization coefficients into quality layers based on the effect such quantization coefficients have on the reconstructed media. When media data packet 111 is generated, the quantization coefficients are sorted based on quality layer instead of based on which block the quantization coefficients describe. Accordingly, the media data packet 111 includes a highest quality layer at the start of the packet payload. Subsequent quality layers have progressively less effect on the quality of the reconstructed media data, and are positioned progressively closer to the end of the packet payload. The lowest quality layer is positioned at the end of the payload of the media data packet 111. Because media data packet 111 is organized in this fashion, a network node 105 experiencing congestion 113 can perform a packet wash by incrementally dropping chunks and/or quality layers from the back of the media data packet 111 until the media data packet 111 is small enough to be stored and/or transmitted. As a result, the media data packet 111 is washed and transmitted at lower quality instead of being dropped due to congestion 113.

Figure 2:
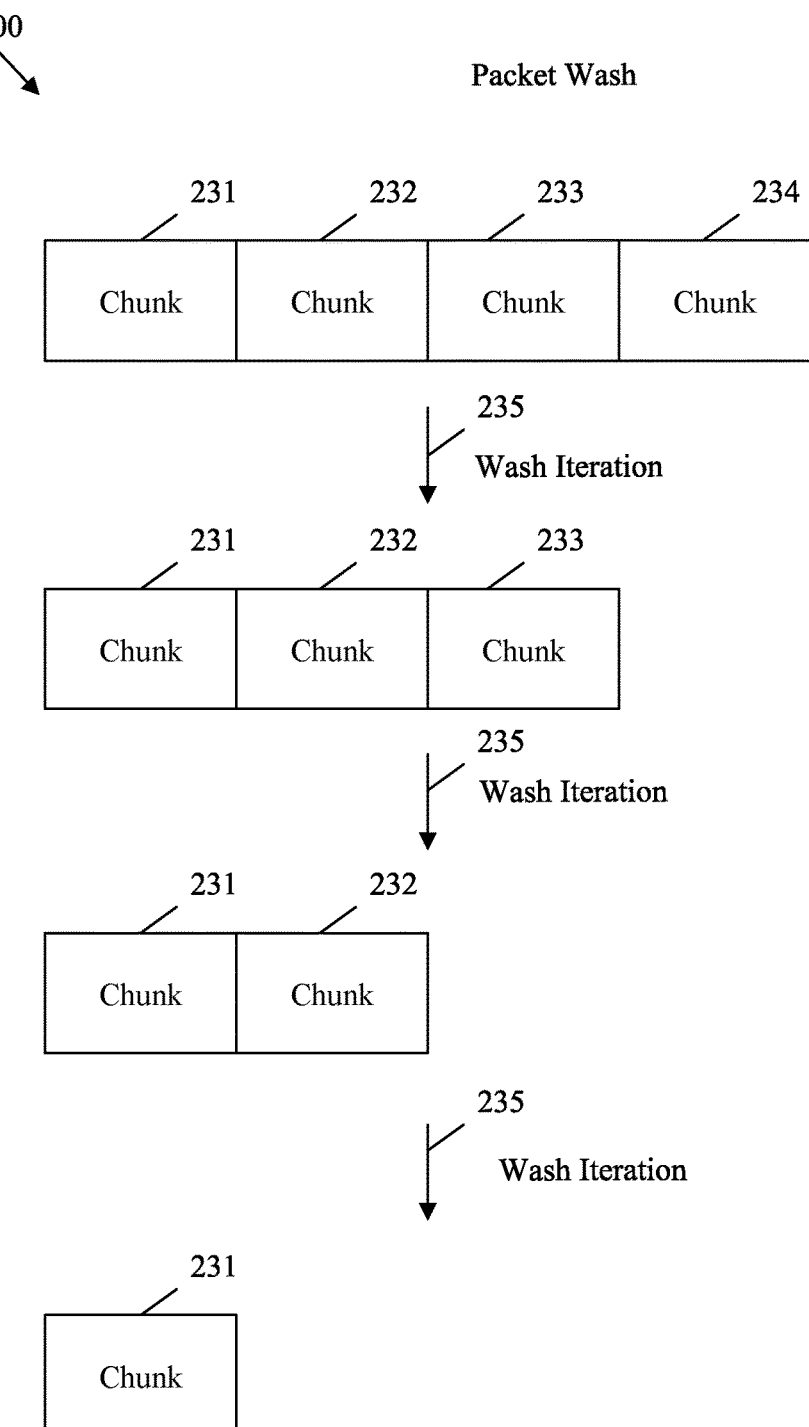
FIG. 2 illustrates an example mechanism of performing a packet wash to support qualitative communication.

FIG. 2 illustrates an example mechanism of performing a packet wash 200 to support qualitative communication. Packet wash 200 may be employed by a network node 105 in network 100. Packet wash 200 is applied to a packet, such as media data packet 111, which may include chunk 231, chunk 232, chunk 233, and chunk 234. The chunks 231-234 contain data arranged in order of decreasing priority with highest priority chunks toward the front of the packet and lowest priority chunks toward the end. When congestion occurs, packet wash 200 begins to incrementally drop chunks from the end of the packet unit the packet is smaller than an outgoing buffer availability is reached. The packet can then be stored for later transmission using the buffer availability. For example, the packet wash 200 can perform a wash iteration 235 by dropping the lowest priority chunk 234 from the end of the packet payload. In the event that the packet is still too large to be transmitted, the packet wash 200 can perform another wash iteration 235 by dropping the lowest priority chunk 233 from the end of the packet payload. In the event that the packet is still too large to be transmitted, the packet wash 200 can perform another wash iteration 235 by dropping the lowest priority chunk 232 from the end of the packet payload. In the event that a packet containing a single chunk 231 cannot be transmitted, the packet can be entirely dropped. Further, the packet can contain metadata indicating a minimum acceptable quality for the packet. The entire packet can be dropped when dropping a chunk 232-234 would reduce the quality of the packet below the minimum acceptable quality. By arranging chunks of quantization coefficients by quality layer instead of by block, media data can be arranged in order of priority so that packet wash 200 can be applied to a media data packet. It should be noted that, as described in more detail below, a chunk 231-234 of a media data packet is a set of quantization coefficients included in a single block in a single quality layer.

Figure 3:
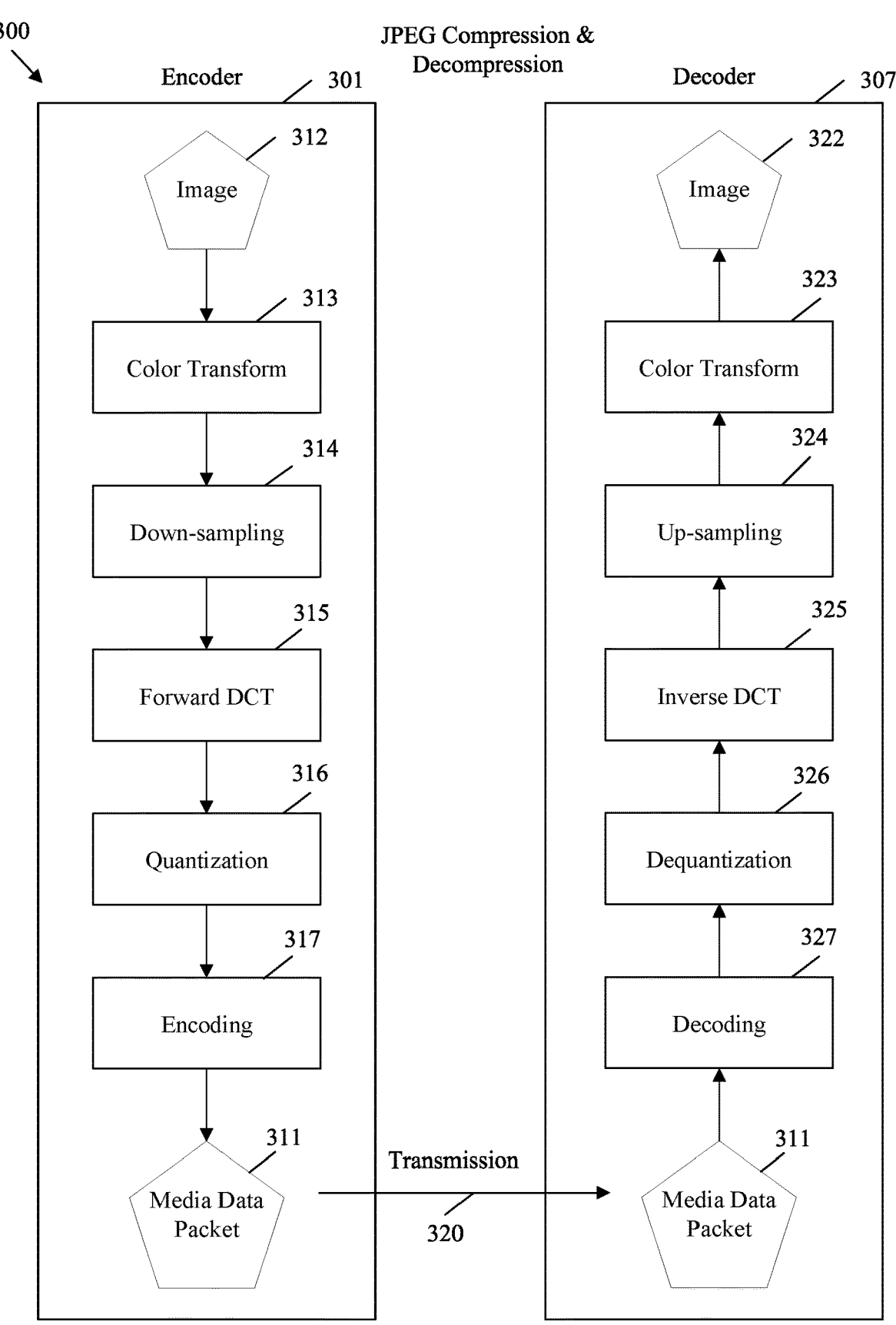
FIG. 3 is a schematic diagram of an example system for JPEG compression and decompression.

FIG. 3 is a schematic diagram of an example system 300 for JPEG compression and decompression. JPEG is an example of media data that can be included in a media data packet, such as media data packet 111, for application of a packet wash 200. The disclosed mechanisms work for many types of media data. However, JPEG provides a clear example of how such mechanisms function. These mechanisms can operate in a similar manner on any media that employs a transform to compress media data into quantization coefficients.

System 300 employs an encoder 301 and a decoder 307, which may be substantially similar to encoder 101 and decoder 107, respectively. The encoder 301 receives an image 312, which may be any representation that depicts visual perception. A color transform 313 is applied to the image 312. The color transform 313 changes the image 312 from a red, blue, and green (RGB) color space into a luminance, blue difference chrominance, and red difference chrominance (YCBCR) color space. Color transform 313 may be an optional step in some systems. However, images in the YCBCR color space can be compressed to a greater degree than images in the RGB space without a significant effect on perceptible image quality.

Down-sampling 314 can then be applied to the image 312. The human eye can more easily detect changes in luminance than in chrominance. As such, down-sampling 314 reduces the spatial resolution of the CB and CR components without changing the spatial resolution of the Y components. This compresses the image 312 without a significant loss of perceptible image quality.

A forward DCT 315 is then applied to the image. Specifically, the forward DCT 315 is applied separately to each of the Y, CB, and CR components. The forward DCT 315 represents a block of image data, for example an eight by eight block of pixels, as a series of quantization coefficients. Specifically, the pixel values change in the spatial domain at various rates depending on the particular image. The forward DCT 315 is a transform that expresses a finite sequence of data points in terms of a sum of cosine functions at different frequencies. Accordingly, the quantization coefficients express modifiers for cosine functions at corresponding frequencies that should be added together to fit the forward DCT 315 to the pixel value changes in the spatial domain. As a result, the quantization coefficients describe pixel value changes for a corresponding component in a frequency domain. A quantization coefficient may be formally defined as a horizontal and/or vertical frequency component that partially describes a sequence of data points in a transformed frequency domain. In a specific example, a component (e.g., Y, CB, or CR) of an eight by eight block of pixels can be represented by an eight by eight matrix containing sixty-four quantization coefficients. As such, each eight by eight block of pixels can be represented by three sets of sixty-four quantization coefficients.

Quantization 316 can be applied to the quantization coefficients. The human eye easily distinguishes low frequency component changes, but generally has trouble with high frequency component changes. As such, quantization 316 replaces actual values of high frequency quantization coefficients with zeros. As a specific example, the quantization coefficients can be divided by a constant in the frequency domain and rounded to the nearest integer, which generally results in rounding higher frequency components to zero. Quantization 316 can reduce file size without having a significant effect on perceptible image quality. However, quantization 316 can begin to effect image quality as frequency decreases. As such, the level of quantization 316 is selected to balance between file size loss of image quality.

Encoding 317 can then be applied to quantization coefficients. For example, entropy coding can be employed to compress the quantization coefficients. Example entropy coding schemes may include arithmetic coding, Huffman coding, or other coding schemes. Entropy coding may compress data by replacing values with code words that are smaller than the actual values and that remove duplicate values in a predictable manner. The encoded quantization coefficients can then be placed in a media data packet 311.

Transmission 320 can be employed to forward the media data packet 311 to the decoder 307, for example in a manner substantially similar to media data packet 111 in network 100. The decoder 307 employs an inverse of the process used by the encoder 301. This converts the media data packet 311 into an image 322. The image 322 is substantially similar to image 312. However, image 322 is affected by the lossy compression used to create the media data packet 311. As such, the image 322 is of lower quality than the image 312. The amount of the quality loss depends primarily on the number of quantization coefficients removed during quantization. 316.

The decoder 307 applies decoding 327 to the media data packet 311. Decoding 327 is selected to reverse the process of encoding 317. As such, decoding 327 employs an entropy-based algorithm that converts code words back to quantization coefficients. The particular algorithm used by decoding 327 is selected based on the algorithm used by encoding 317 to ensure that the encoding process 317 is exactly (and losslessly) reversed by decoding 327.

Dequantization 326 can be applied to the decoded quantization coefficients. Specifically, dequantization 326 can reverse some of loss caused by the quantization 316. For example, dequantization 326 may multiply the quantization coefficients by a constant in the frequency domain. This reverses data changes to quantization coefficients that have not been rounded to zero. However, such multiplication may have no effect on the zero quantization coefficients.

An inverse DCT 325 is applied to convert the quantization coefficients back into Y, CB, and CR component values. The inverse DCT 325 may be selected based on the forward DCT 315. The inverse DCT 325 is applied to each of the components (e.g., three per block) to convert the data from the frequency domain back to the spatial domain, which results in an image 322. The decoder 307 can then perform up-sampling 324 on the image 322 to reverse the down-sampling 314. Up-sampling 324 may increase the resolution of the chrominance components to match the resolution of the luminance components. The decoder 307 can also apply a color transform 323 to convert the image 322 from the YCBCR color space back to a RGB color space. The result is a reconstructed image 322 that approximates image 312 minus any data loss due to compression (e.g., quantization 316).

FIG. 4 is a schematic diagram illustrating an example set of quantization coefficients 400 generated to represent a block of an image. For example, quantization coefficients 400 may be created when a forward DCT 315 is applied to an image. The resulting quantization coefficients 400 may be encoded into a chunk of a media data packet 111 for transmission through a network 100 and subjected to a packet wash 200.

The quantization coefficients 400 are entropy coded. Specifically, FIG. 4 depicts an application of Huffman coding to the quantization coefficients 400. The quantization coefficients 400 are denoted based on a corresponding frequency. As shown, the first quantization coefficient 400 at the top left of the block is denoted as a direct current (DC) coefficient. Further quantization coefficients 400 are denoted as alternating current (AC) with a number. Specifically, the quantization coefficients 400 include DC and AC1 through AC63. The quantization coefficients 400 are numbered in a zig zag pattern (shown by arrows) based on corresponding frequencies. The result is a mechanism for grouping quantization coefficients 400 by frequency and hence by how much the quantization coefficients 400 effect the visual quality of the reconstructed image. The Huffman coding algorithm uses codewords to represent the quantization coefficients 400 in the order shown. The codewords remove any redundancies. For example, if AC components that are adjacent in the zig zag order share the same value, then the same codeword can represent all of such AC components. This is particularly useful when the quantization process rounds many of the adjacent quantization coefficients 400 to a value of zero. Huffman coding is described herein as applied to a block of a JPEG image. However, Huffman coding may be applied to many other types of media, such as video and/or audio, as well. Further, Huffman coding is depicted as a specific example of a type of entropy coding. Other types of entropy coding may also be used to compress media that has been transformed into blocks of quantization coefficients 400.

FIG. 5 is a schematic diagram illustrating an example mechanism 500 for grouping quantization coefficients for a block into quality layers 541 based on corresponding effects on image quality. For example, mechanism 500 can be applied by an encoder 101 and/or a content server 103 in network 100 when creating a media data packet 111. Mechanism 500 allows packet wash 200 to be applied to a media data packet 111. For example, mechanism 500 can be applied by an encoder 301 after application of a forward DCT 315 and/or quantization 316 and prior to encoding 317, and hence prior to application of entropy coding to quantization coefficients 400.

Mechanism 500 sorts quantization coefficients into quality layers 541, which allows a packet wash to remove layers from a packet. Stated differently, mechanism 500 sorts quantization coefficients so a network node can dynamically perform a form of quantization on a media data packet in response to congestion instead of requiring that quantization occur at an encoder prior to encoding. As used herein, a quality layer 541 is a grouping of quantization coefficients based on similarity of frequency and resulting effect on decompressed image quality. As noted above, quantization coefficients have a reduced effect on image quality at higher frequencies. Specifically, when a block of quantization coefficients is traversed in a zig zag pattern from a top left to a bottom right, the quantization coefficients have incrementally less effect on image quality as the traversal proceeds toward the bottom right.

As a specific example, mechanism 500 can select a number of quantization coefficients to position in each layer. Mechanism 500 can then traverse the block of quantization coefficients in a zig zag pattern 542. Zig zag pattern 542 begins at the top position of a first column of a matrix and proceeds to a top position of a second column of the matrix. The zig zag pattern 542 then repeatedly proceeds in a diagonal direction until the left most unvisited position is reached before returning to a top right unvisited position until the entire matrix is traversed. While traversing the matrix in zig zag pattern 542, mechanism 500 sorts the coefficients into a current layer until a predetermined number of coefficients for the current layer is reached. The mechanism 500 then proceeds to the next layer until all coefficients are assigned. In the example shown, the quantization coefficients are assigned into five layers. However, any number of layers can be employed. Further, other zig zag patterns may be employed, such as the zig zag pattern employed in entropy coding as applied to quantization coefficients 400. Regardless of the particular algorithm employed, mechanism 500 sorts the quantization coefficients into quality layers 541 based on frequency such that the quality layers 541 have a decreasing effect on image quality upon reconstruction.

Figure 6:
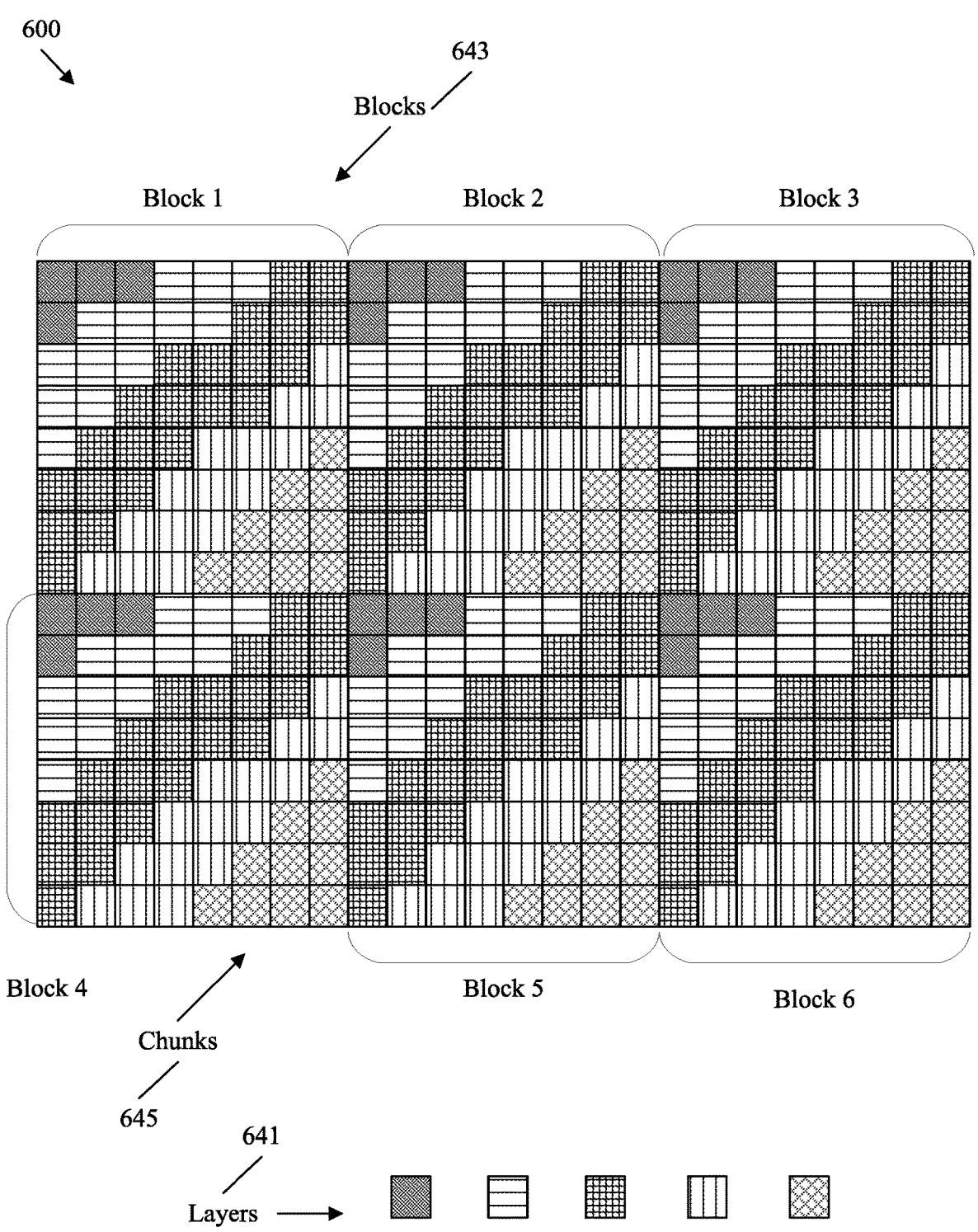
FIG. 6 is a schematic diagram illustrating an example media data with quantization coefficients grouped into layers and chunks.

FIG. 6 is a schematic diagram illustrating an example media data 600 with quantization coefficients grouped into layers 641 and chunks 645. For example, mechanism 500 can be applied to media data 600. As such, media data 600 can be encoded by an encoder 101 and/or by a content server 103 in network 100 in order to create a media data packet 111. Media data 600 is grouped to allow a packet wash 200 to be applied to a media data packet 111. For example, media data 600 can be sorted by an encoder 301 after application of a forward DCT 315 and/or quantization 316 and prior to encoding 317, and hence prior to application of entropy coding to quantization coefficients 400.

Mechanism 500 is shown as being applied to a single block of an image (e.g., JPEG), video, and/or audio content. Media data 600 results when mechanism 500 is applied to multiple blocks 643 of content. While media data 600 may include many blocks 643, six blocks 643 are shown in FIG. 6 to illustrate the concept. For example, media data 600 can be partitioned into blocks 643 prior to application of a transform, and the resulting quantization coefficients can be sorted into quality layers 641. A block 643 is a grouping of samples of a predetermined size to support compression and/or decompression mechanisms. A sample may be color and/or light values in an image, audio levels in a sound file, etc. In a JPEG, a block 643 generally includes a group of sixty-four samples (e.g., an eight by eight block of a component, such as Y, $C_b$, or $C_r$). Quality layers 641 may be substantially similar to quality layers 541. Hence, a quality layer 641 is a grouping of quantization coefficients based on similarity of frequency and resulting effect on decompressed image quality.

As shown, a quality layer 641 includes quantization coefficients of a similar frequency across multiple blocks 643. The quality layers 641 can also be arranged into chunks 645. A chunk 645 is a set of quantization coefficients that are included in a single block 643 and in a single quality layer 641. In the example shown, six blocks 643 are present with quantization coefficients grouped into five quality layers 641. Accordingly, each quality layer 641 includes a number of chunks 645 equal to the number of blocks 643, in this example six. Further, each block 643 includes a number of chunks 645 equal to the number of quality layers 641, in this example five. Once the quantization coefficients have been sorted into chunks 645 and/or quality layers 641, the quantization coefficients can be positioned into a media data packet to support a packet wash.

Figure 7:
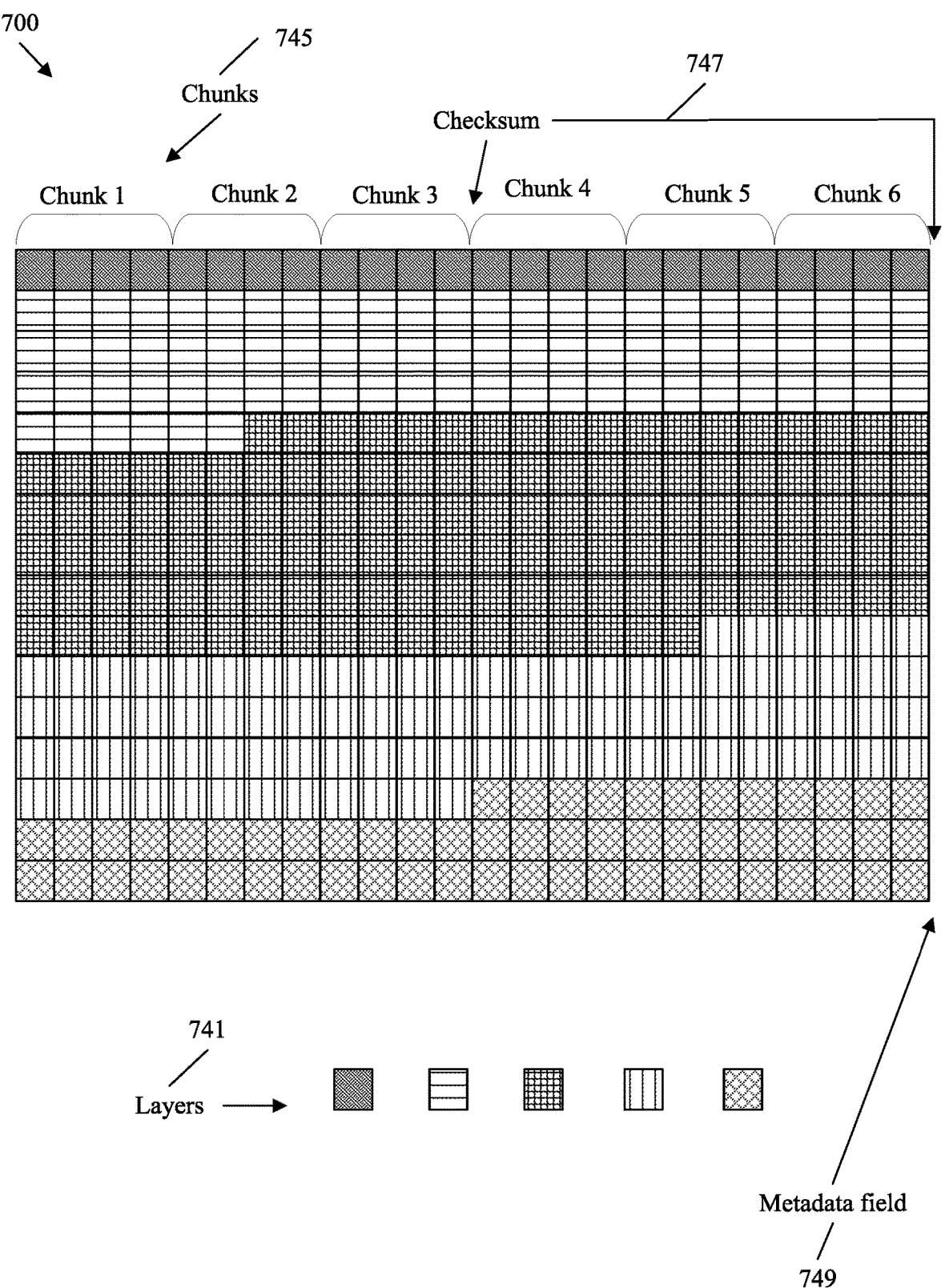
FIG. 7 is a schematic diagram illustrating an example media data packet encoding containing quantization coefficients positioned based on effect on quality instead of based on location in the media data.

FIG. 7 is a schematic diagram illustrating an example media data packet 700 encoding containing quantization coefficients positioned based on effect on quality instead of based on location in the media data. Specifically, media data packet 700 is an encoding based on media data 600. Accordingly, mechanism 500 can be applied to media data 600 prior to encoding media data packet 700. Further, media data packet 700 can be encoded by an encoder 101 and/or by a content server 103 in network 100, and hence is an example of a media data packet 111. Media data packet 700 contains quantization coefficients positioned to allow a packet wash 200 to be applied to the media data packet 700. For example, media data packet 700 can be encoded by an encoder 301 for transmission 320 as an example of a media data packet 311. Hence, media data packet 700 may be coded according to entropy coding as described with respect to quantization coefficients 400.

As shown in FIG. 6, the quantization coefficients of media data 600 are sorted in order of the blocks that contain such media data 600. In contrast, the quantization coefficients of media data packet 700 have been sorted based on quality layer 741. For example, the quantization coefficients for each block can be sorted into quality layers 741, which results in chunks 745, which may be substantially similar to quality layers 641 and chunks 645, respectively. All the chunks 745 associated with the first quality layer 741 are positioned from the start of the payload in an order based on the block associated with each chunk 745. In the example shown, chunk 1 from block 1 is positioned first, followed by chunk 2 from block 2, etc. The chunks 745 in the first quality layer 741 have the greatest effect of visual quality, and hence are positioned first in the payload of the media data packet 700. As such, the first quality layer 741 is not discarded by a packet wash, which begins discarding data from the end of the media data packet 700. The chunks associated with the second quality layer 741 are positioned in order of the corresponding blocks after the chunks for the first quality layer 741. The chunks associated with the third quality layer 741 are positioned in order of the corresponding blocks after the chunks for the second quality layer 741. The chunks associated with the fourth quality layer 741 are positioned in order of the corresponding blocks after the chunks for the third quality layer 741. The chunks associated with the fifth quality layer 741 are positioned in order of the corresponding blocks after the chunks for the fourth quality layer 741. This order is referred to as quality layer 741 order as the quantization coefficients are arranged based on quality layer 741 instead of based on the block that includes the quantization coefficients. For example, the first chunk 745 for the first block in the first quality layer 741 is separated from the second chunk 745 of the first block by the chunks from the other blocks that are also in the first quality layer 741. This is because the second chunk 745 of the first block is contained in the second quality layer 741. As such, the quantization coefficients for each block are sorted throughout the entire media data packet 700 based on the quality layer 741 that contains such quantization coefficients.

By using the quality layer 741 order described above, a packet wash can iteratively remove the end of the media data packet 700 as desired until the media data packet 700 is small enough to transmit in spite of any network congestion. By removing quantization coefficients by quality layer 741 in this manner, the quantization coefficients are removed in an order that has the least effect on image quality. In effect, the packet wash performs a quantization on the media data packet 700 during transmission and resizes the underlying media in response to network conditions. Such a real time quantization by a network node may not be otherwise possible without the mechanisms described herein as other networks can only perform quantization during the encoding process and prior to transmission.

In order to support a packet wash, checksums 747 can be applied in the media data packet 700. A checksum 747 is a small sized portion of data derived from a block of digital data for the purpose of detecting errors occurring during transmission and/or storage. The packet wash may use a checksum 747 for error checking a preceding segment of a packet. Hence, the packet wash may select a checksum 747 and remove all payload data after the checksum 747. The checksums 747 may be positioned after each quality layer 741 and/or after each chunk 745. Placing checksums 747 after each quality layer 741 allow a packet wash to sequentially drop each quality layer 741 from the end of the media data packet 700 toward the front of the media data packet

700. In contrast, placing checksums 747 after each chunk 745 allows a packet wash to sequentially drop each chunk 745 from the end of the media data packet 700 toward the front of the media data packet 700. Dropping chunk 745 by chunk 745 allows the packet wash to perform at greater precision and therefore to retain as much media data quality as possible. However, dropping quality layer 741 by quality layer 741 results in media data that is a consistent quality. Different media may be served better by different approaches. For example, a JPEG may be preferably displayed at a consistent quality while an audio file may not be noticeably impacted by inconsistent quality. Accordingly, different approaches may be beneficial for different applications.

The media data packet 700 may also comprise metadata field 749. A metadata field 749 is a field of data in a packet that provides information about other data (e.g., in the same packet). Accordingly, metadata field 749 may contain metadata that describes media data packet 700. For example, the metadata field 749 may contain data indicating the number of blocks (e.g., blocks 643) included in the media data, and hence contained in the media data packet 700. As another example, the metadata field 749 may contain data indicating the number of quality layers 741 in the media data packet 700. As another example, the metadata field 749 may contain data indicating the size of each of the quality layers 741 and/or chunks 745 in the media data packet 700. In some examples, the metadata field 749 may contain data indicating a loss tolerance lower bound. A loss tolerance lower bound may indicate an amount of data loss/quantization a requestor of the media data is willing to accept. Accordingly, the loss tolerance lower bound may indicate the number of quality layers 741 that can be removed by a packet wash. If a packet wash would remove too many quality layers 741 to meet the loss tolerance lower bound, a node handling the media data packet 700 may simply drop the entire media data packet 700. As another example, the metadata field 749 may contain data indicating a number of remaining quality layers 741 and/or a number of remaining chunks 745. The number of remaining quality layers 741/number of remaining chunks 745 can be initialized to the number of quality layers 741/chunks 745 that are encoded into the media data packet 700. The number of quality layers 741/chunks 745 can then be decremented any time a quality layer 741/chunk 745 is removed. Hence, the decoder can read the number of quality layers 741/chunks 745 to determine how much data remains after a packet wash has been performed by the network.

FIG. 8 is a schematic diagram of an example media processing device 800. The media processing device 800 is suitable for implementing the disclosed examples/embodiments as described herein. The media processing device 800 comprises downstream ports 820, upstream ports 850, and/or transceiver units (Tx/Rx) 810, including transmitters and/or receivers for communicating data upstream and/or downstream over a network. The media processing device 800 also includes a processor 830 including a logic unit and/or central processing unit (CPU) to process the data and a memory 832 for storing the data. The media processing device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The media processing device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx 810, upstream ports 850, and memory 832. The processor 830 comprises a coding module 814. The coding module 814 implements the disclosed embodiments described herein, such as packet wash 200, mechanism 500, and/or method 900, 1000, 1100, 1200, and/or 1300, which may employ quantization coefficients 400, a media data 600, and/or a media data packet 700. The coding module 814 may also implement any other method/mechanism described herein. Further, the coding module 814 may implement a device in network 100, a device in system 300 and/or a device in system 1400. For example, when operating on an encoder the coding module 814 may transform media data, such as an image, into quantization coefficients and sort the quantization coefficients into chunks and/or layers based on their effect on media data/image quality. When operating on a network node, the coding module 814 may perform a packet wash by iteratively discarding portions of a media data packet based on chunk and/or level to allow the media data packet to be transmitted at a lower quality rather than being dropped. When operating on a decoder node, the coding module 814 may sort quantization coefficients from a layer ordering to an ordering based on block position in order to decode media data from a media data packet processed according to qualitative communication mechanisms.

Accordingly, the coding module 814 may be configured to perform mechanisms to address one or more of the problems discussed above. Hence, coding module 814 causes the media processing device 800 to provide additional functionality and/or coding efficiency when coding media data. As such, the coding module 814 improves the functionality of the media processing device 800 as well as addresses problems that are specific to the image coding arts. Further, the coding module 814 affects a transformation of the media processing device 800 to a different state. Alternatively, the coding module 814 can be implemented as instructions stored in the memory 832 and executed by the processor 830 (e.g., as a computer program product stored on a nontransitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

FIG. 9 is a flowchart of an example method 900 of encoding media data to support qualitative communication. For example, method 900 may be employed by an encoder 101, a content server 103, an encoder 301, and/or a media processing device 800. Method 900 may employ mechanism 500 to sort media data 600 and/or coefficients 400 into a media data packet 700 to support implementation of packet wash 200.

Method 900 may be initialized when an encoder determines to encode media data, such as an image, video, and/or audio data. At step 901, the encoder obtains and reads a quality level schema. The quality level schema defines the number of quantization coefficients allocated for each quality layer. It should be noted that a quality layer may also be referred to as a quality level. The quality level schema may be predefined. In another example, a user may indicate a lower quality bound for requested content, and the quality level schema may be computed based on the lower quality bound. For example, the first quality layer may be configured to contain a number of quantization coefficients that would satisfy the lower quality bound. In this example, a packet wash could remove all but the first quality layer, as there may be little utility in having a quality layer that does not contain enough quantization coefficients to satisfy the lower quality bound (when such is known by the encoder).

At step 903, the encoder can set the number of quality levels/layers based on the schema and any associated data known to the encoder. For example, the encoder can set the number of quality levels/layers based on current/average network throughput, a user loss tolerance range, and/or user decompression capabilities.

At step 905, the encoder can set the number of quantization coefficients for each quality level/layer. For example, the maximum number of quantization coefficients for a layer may be denoted as Layer and the set of quantization coefficients for a layer may be denoted as $C[1 \ldots \text{Layer}]$.

At step 907, the encoder can get/obtain the number of blocks, denoted as M, to be encapsulated and fit into a media data packet from a media bitstream. The encoder can also set a counter variable indicating a current layer (L) equal to one.

At step 909, the encoder can determine if L is less than or equal to Layer. If so, the encoder can proceed to step 911 and rearrange the quantization coefficients for a current layer L for all blocks M (e.g., obtain all chunks for the current quality layer) as described with respect to media data 600 and media data packet 700. The encoder can then increment L and return to step 909. At step 909, if L is greater than Layer, and hence L is not less than or equal to Layer, then the encoder proceeds to step 913.

At step 913, the encoder employs entropy coding, such as Huffman encoding, for example as described with respect to encoding 317 and quantization coefficients 400. This process may involve generating codewords to represent the quantization coefficients and then employing zero padding of the quantization coefficients. At step 915, the encoder can then generate a compressed media data packet, such as media data packet 700.

FIG. 10 is a flowchart of an example method 1000 of decoding media data processed by qualitative communication. For example, method 1000 can be employed by a decoder 107, a decoder 307, and/or a media processing device 800. Method 1000 can be employed to decode a media data packet 700 that includes media data 600 and/or coefficients 400 sorted according to mechanism 500. Further, method 1000 can be applied to a media data packet that has been subjected to a packet wash 200, for example in response to method 900.

At step 1001, the decoder receives a media data packet, such as media data packet 700. The media data packet contains encoded quantization coefficients arranged based on quality layer instead of based on an order of blocks in the media data. The decoder can obtain various data from a metadata field in the media data packet. Such data may include a loss tolerance lower bound and a number of remaining layers. The decoder can compare the remaining quality layers and the loss tolerance lower bound at step 1003. If the remaining quality layers are not greater than or equal to the loss tolerance lower bound, then the decoder proceeds to step 1009 and stops further decoding. This occurs when the media data has been degraded/quantized too much during a packet wash to meet the user's requested minimum quality. If the remaining quality layers are greater than or equal to the loss tolerance lower bound, then the decoder proceeds to step 1005 and sets a counter variable for a current layer L equal to one.

At step 1007, the decoder can check to determine whether current layer L is less than or equal to the number of remaining numbers. If L is greater than (not less than or equal to) the remaining layers, then the decoder proceeds to step 1009 and stops decoding because the process is complete. If L is less than or equal to the remaining layers at step 1007, then the decoder determines to decode the current layer L and proceeds to step 1011.

At step 1011, the decoder obtains all chunks from the media data packet that carry Lth level quantization coefficients for any/all blocks contained in the media data packet. At step 1013, the decoder performs entropy decoding, such as Huffman decoding, for the quantization coefficients obtained at step 1011. For example, the decoder can iteratively decode layers [1,L] and apply zero padding for layers [L+1, Layer].

At step 1015, the decoder can create a 2D square matrix for each block from the linear array of quantization coefficients obtained from the media data packet. This process may also be referred to as a de-zigzag and has the effect of positioning the quantization coefficients back in their proper position in a block matrix for decoding.

At step 1017, the decoder applies any dequantization algorithms along with an inverse transform (e.g., inverse DCT) to reconstruct the blocks of media data at the current quality layer L. As step 1017 is part of an iterative loop, the blocks are decoded at a lowest quality and then incrementally improved as further quality layers are added. The decoder can then proceed to step 1019, increment L to proceed to the next quality layer, output the decoded media data blocks and return to step 1007 to decode the next quality layer.

FIG. 11 is a flowchart of another example method 1100 of encoding media data to support qualitative communication. For example, method 1100 may be employed by an encoder 101, a content server 103, an encoder 301, and/or a media processing device 800. Method 1100 may employ mechanism 500 to sort media data 600 and/or coefficients 400 into a media data packet 700 to support implementation of packet wash 200. Method 1100 is another example of method 900, and hence can be employed in conjunction with method 1000.

Method 1100 may be initialized when an encoder determines to encode media data, such as an image, video, and/or audio data. At step 1101, the encoder can partition media data into a plurality of blocks. For example, when the media data is a JPEG, the encoder can convert the image into a YCBCR color space and then partition each component into eight by eight blocks of samples. This may result in three blocks for each eight by eight set of pixels. The encoder can then apply a transform, such as a DCT, to the blocks to obtain a plurality of quantization coefficients for each block.

At optional step 1103, the encoder can receive a request for the media. The request may include a loss tolerance lower bound. For example, the request for media may be received before step 1101 in some examples. In other examples, the encoder and/or a corresponding content server can store the blocks as quantization coefficients and wait for a request to determine how to encode the blocks. In these examples, the encoder can use the loss tolerance lower bound when determining how to group the quantization coefficients into layers at step 1105. In other examples, the encoder can encode the quantization coefficients without considering the loss tolerance lower bound. In these examples, the loss tolerance lower bound is only placed in the metadata of the final media data packet to support a packet wash mechanism and/or decoding at a decoder.

At step 1105, the encoder can sort the quantization coefficients into quality layers of decreasing priority based on frequency. In some examples, the quantization coefficients are sorted into quality layers based in part on the loss tolerance lower bound. For example, the highest quality layer may be configured to contain enough quantization coefficients to meet the loss tolerance lower bound. This approach may be particularly beneficial for media generated and consumed in real time, such as video conferences. Encoding based on a loss tolerance lower bound may be difficult for static media, such as pictures used in web pages, as this may involve repeatedly compressing data for each user requesting the media data. In such a case, using static predetermined sizes for quality layers may be beneficial. In either case, each subsequent layer includes data to incrementally increase the quality of a resulting reconstructed media data.

At step 1107, the encoder can position quantization coefficients for all blocks in a media data packet according to quality layer in order of decreasing priority. Priority is associated with the effect a quality layer has on quality of a reconstructed image, with higher effect receiving greater priority and lower effect receiving lower priority. For example, the quantization coefficients may be sorted into chunks. Each chunk includes all quantization coefficients for a corresponding block at a corresponding quality layer. The encoder can obtain chunks from each block at each quality layer. The encoder can include chunks corresponding to a plurality of blocks at a same quality layer in adjacent positions in the media data packet. For example, the encoder can position chunks for the highest quality layer in adjacent positions at the start of the payload for a media data packet. The encoder can then incrementally position chunks for further quality layers into the media data packet in quality layer order (e.g., second quality layer, then third quality layer, etc.) This results in the chunks of the lowest quality layer being positioned in adjacent positions at an end of the payload of the media data packet. These quality layers are positioned to support incremental partial drops of each least significant quality layer from the media data packet during transmission (e.g., packet wash) while retaining one or more most significant layers.

At step 1109, the encoder can position checksums to support partial packet drops. For example, the encoder can position a checksum after each quality layer in the media data packet. This supports dropping entire quality layers during a packet wash. In another example, the encoder can position a checksum after each chunk in the media data packet. This supports dropping incrementally dropping chunk by chunk during a packet wash.

At step 1111, the encoder can encode one or more metadata fields in the media data packet. The metadata fields may include a number of blocks in the media data, a number of quality layers used to encode the media data, a size of each quality layer, a loss tolerance lower bound (e.g., from step 1103), a number of remaining layers set to the number of quality layers used to encode the media data, or combinations thereof. The number of remaining layers can be decremented whenever a quality layer is discarded during a packet wash.

At step 1113, the encoder can store the media data packet. The storage may be temporary and/or long term. For example, the encoder may store the media data packet only until the packet can be transmitted towards a content server and/or a decoder that has requested the media data. Alternatively, the encoder can store the media data packet in long term memory and transmit the media data packet whenever a user/decoder requests the media data.

FIG. 12 is a flowchart of an example method 1200 of applying qualitative communication to a media data packet, such as a media data packet 700 that includes media data 600 and/or coefficients 400 sorted according to mechanism 500. Method 1200 can be employed by a network node 105. Further, method 1200 can be applied as part of packet wash 200, for example by a node positioned between an encoder 301 and decoder 307. Method 1200 can also be employed by a media processing device 800. Method 1200 can be applied in conjunction with methods 900, 1000, 1100, and/or 1300.

Method 1200 is implemented on a network node configured to perform qualitative communication by applying a packet wash in order to reduce the size of packets in transit when the network node experiences network congestion. Method 1200 may be initialized when a network node receives a media data packet containing media data at step 1201, for example as a result of method 1100. The media data packet contains a plurality of coded blocks representing media data, such as an image, a portion of a video, a portion of an audio file, etc. Specifically, the media data packet comprises quantization coefficients for all blocks. Further, the quantization coefficients are positioned in quality layers of decreasing priority based on frequency. Priority is associated with the effect a quality layer has on quality of a reconstructed media data, with higher effect receiving greater priority and lower effect receiving lower priority. Hence, the quality layers are positioned in the media data packet in an order so that each subsequent layer includes data to incrementally increase the quality of reconstructed media data. For example, the quantization coefficients may be sorted into chunks. Each chunk includes all quantization coefficients for a corresponding block at a corresponding quality layer. The chunks corresponding to a plurality of blocks at a same quality layer may be included in adjacent positions in the media data packet.

At step 1203, the network node determines a loss tolerance lower bound from the media data packet. For example, the media data packet may include one or more metadata fields. The metadata fields may include information describing the media data in the media data packet. For example, the metadata fields may include a number of blocks in the media data, a number of quality layers used to encode the media data, a size of each quality layer, a loss tolerance lower bound, a number of remaining layers, or combinations thereof. Hence, the network node may determine the loss tolerance lower bound from the metadata in the media data packet. The loss tolerance lower bound can indicate a number of quality layers and/or quantization coefficients that can be dropped during a packet wash without reducing the quality of the media data to a level unacceptable to the end user.

At step 1205, the network node can determine an outgoing buffer availability. The outgoing buffer availability indicates the amount of memory, processing resources, and/or network resources that are available at the network node for allocation to handling the media data packet. The network node may continually maintain such data for managing network traffic and recognizing network congestion. When the outgoing buffer availability is insufficient to transmit the media data packet, the network node determines to perform a packet wash on the media data packet.

At step 1207, the network node determines a packet wash should be performed due to congestion (e.g., the outgoing buffer availability and/or link throughput is insufficient to retain the media data packet in the buffer until the media data packet can be transmitted). Accordingly, the network node begins to incrementally drop each least significant quality layer of the media data packet until the outgoing buffer is able to retain the packet. Once the outgoing buffer availability is reached, the media data packet can be transmitted because there are sufficient resources at the network node to perform such a transmission. As such, the network node does not drop any more layers once the outgoing buffer availability and/or link throughput capability is reached. The mechanism for incrementally dropping each least significant quality layer includes removing quantization coefficients from an end of the payload of the media data packet, because the lowest priority information is stored at the end of the media data packet. In some examples, a checksum is positioned after each quality layer in the media data packet. In such cases, incrementally dropping each least significant quality layer includes incrementally dropping each last quality layer in the media data packet until the outgoing buffer availability and/or link throughput capability is reached. Accordingly, this example drops an entire layer for each iteration of the packet wash. In another example, a checksum is positioned after each chunk in the media data packet. In such a case, incrementally dropping each least significant quality layer includes incrementally dropping each last chunk in the media data packet until the outgoing buffer availability and/or link throughput capability is reached. Accordingly, this example drops individual chunks of data for each iteration of the packet wash. Dropping chunks instead of entire quality layers retains the maximum amount of data possible, but may also cause quality variation in the reconstructed image. Further, the network node may decrement the number of remaining layers as indicated in the metadata each time a quality layer is dropped. As such, the number of remaining layers retains information on how many quality layers are left after one or more network nodes perform packet wash(es) on a media data packet.

Presuming the loss tolerance lower bound in the metadata is still met once the packet wash is complete, the network node may transmit the media data toward the decoder at step 1209. However, if a current quality layer must be dropped to satisfy the outgoing buffer availability, and dropping the current quality layer would reduce the media data packet below the loss tolerance lower bound, then the entire media data packet may be dropped. In this case, the packet wash can not be performed in a manner that would satisfy the user's request for the media data as the packet wash would otherwise remove too much quality from the media data.

It should be noted that method 1200 is described to support clarity of discussion. However, method 1200 could also be modified to check compliance with the outgoing buffer availability and/or link throughput capability and the lower tolerance bound prior to performing partial packet drops. In this way, the network node may recognize the case that the packet wash cannot be completed and may drop the packet immediately rather than employing processing resources to perform a packet wash that will ultimately fail. Regardless of the examples employed, the network node may employ method 1200 to quantize/reduce the quality of an encoded media data packet actively in transit. This removes a typical limitation that media data quality must be set at the time of encoding.

FIG. 13 is a flowchart of another example method 1300 of decoding media data processed by qualitative communication. For example, method 1300 can be employed by a decoder 107, a decoder 307, and/or a media processing device 800. Method 1300 can be employed to decode a media data packet 700 that includes media data 600 and/or coefficients 400 sorted according to mechanism 500. Further, method 1300 can be applied to a media data packet that has been subjected to a packet wash 200, for example in response to method 900. Method 1300 is another example of method 1000, and hence method 1300 can be employed in conjunction with methods 900, 1100, and/or 1200.

Method 1300 may begin when a decoder determines to request media data, for example based on a user request. At step 1301, the decoder transmits a request for the media data prior to receiving a media data packet at step 1303. The request may include a loss tolerance lower bound. In some examples, the loss tolerance lower bound in the request may act as in indication to the encoder and/or a corresponding content server how quantization coefficients should be sorted into quality layers in the media data packet.

At step 1303, the decoder receives the media data packet for the media data requested at step 1301. The media data contains a plurality of blocks. Further, the media data is coded in the media data packet as quantization coefficients due to application of a corresponding transform, such as DCT. Specifically, the quantization coefficients for all blocks are positioned in the media data packet in quality layers of decreasing priority based on frequency. In some examples, the quantization coefficients are sorted into quality layers based in part on the loss tolerance lower bound of step 1301. For example, the highest quality layer may be configured to contain enough quantization coefficients to meet the loss tolerance lower bound. Priority is associated with the effect a quality layer has on quality of a reconstructed media data, with higher effect receiving greater priority and lower effect receiving lower priority. For example, the quantization coefficients may be sorted into chunks. Each chunk includes all quantization coefficients for a corresponding block at a corresponding quality layer. The chunks corresponding to a plurality of blocks at a same quality layer may be included in adjacent positions in the media data packet. For example, the chunks for the highest quality layer may be coded in adjacent positions at the start of the payload for a media data packet. The chunks for further quality layers may then be incrementally positioned in the media data packet in quality layer order (e.g., second quality layer, then third quality layer, etc.) As such, each subsequent layer includes data to incrementally increase quality of a reconstructed media data. This results in the chunks of the lowest quality layer being positioned in adjacent positions at an end of the payload of the media data packet. These quality layers are positioned to support incremental partial drops of each least significant quality layer from the media data packet during transmission (e.g., packet wash) while retaining one or more most significant layers. In some examples, the media data packet includes a checksum positioned after each quality layer and/or after each chunk in the media data packet to support incremental partial drops of quality layers and/or chunks, respectively.

At step 1305, the decoder can iteratively decode each block from the quantization coefficients in order of most significant quality layer to least significant quality layer via an inverse transform. For example, the decoder can decode all of the blocks at a first quality layer, then improve the quality of the reconstructed media by decoding the blocks at a second quality layer, etc., until all layers have been decoded. In some examples, the media data packet includes one or more metadata fields. The metadata field may indicate a number of remaining layers contained in the media data packet. The number of remaining layers may indicate how many quality layers are left after any packet washing that occurred during transmission. As such, the decoder may employ the number of remaining layers to determine how many quality layers should be decoded. Further, the metadata fields may contain other metadata, such as a number of blocks in the media data, a number of quality layers, a size of each layer, a loss tolerance lower bound, or combinations thereof. The decoder may iteratively decode each block based on the data in the metadata fields. For example, the decoder can determine the original number of quality layers from the number of quality layers, and hence may determine whether a packet wash has occurred. Further, the decoder may employ the number of blocks and/or the size of the quality layers to determine when each iteration of the decoding process is complete. In addition, the decoder may employ the loss tolerance lower bound, the number of quality layers, and the number of remaining layers to determine whether the media data is of sufficient quality to meet the request of step 1301. When the media is not of sufficient quality (e.g., based on the loss tolerance lower bound, the number of quality layers, and the number of remaining layers) the decoder may drop the media data packet and transmit another request for the media data.

Once the blocks have been decoded and transformed (e.g., by entropy decoding, inverse DCT transform, reformatted from YCBCR to RGB format, etc.), the decoder can combine the blocks to reconstruct the media data. The reconstructed media data may be stored at the decoder. Further, the reconstructed media data may be displayed and or played back to the end user. For example, the processor of the decoder may forward the media data toward a display and/or speaker for viewing/listening by the end user.

As noted above, the decoder may receive fewer quality layers than desired. In some examples, the decoder may determine which quality layers were dropped during transmission and request that such quality layers be retransmitted. For example, the decoder may compare the number of remaining layers to the number of layers, as indicated in the metadata fields. The decoder may then transmit a request for the dropped layers. For example, the decoder may transmit a request message to the encoder and/or an associated content server. The request may indicate the media data requested along with an indication of the quality layers that were dropped. The encoder may retransmit the requested quality layers. The decoder may then receive and decode the retransmitted quality layers and use such decoded retransmitted quality layers to improve the quality of the media data prior to display and/or playback to a user.

Figure 14:
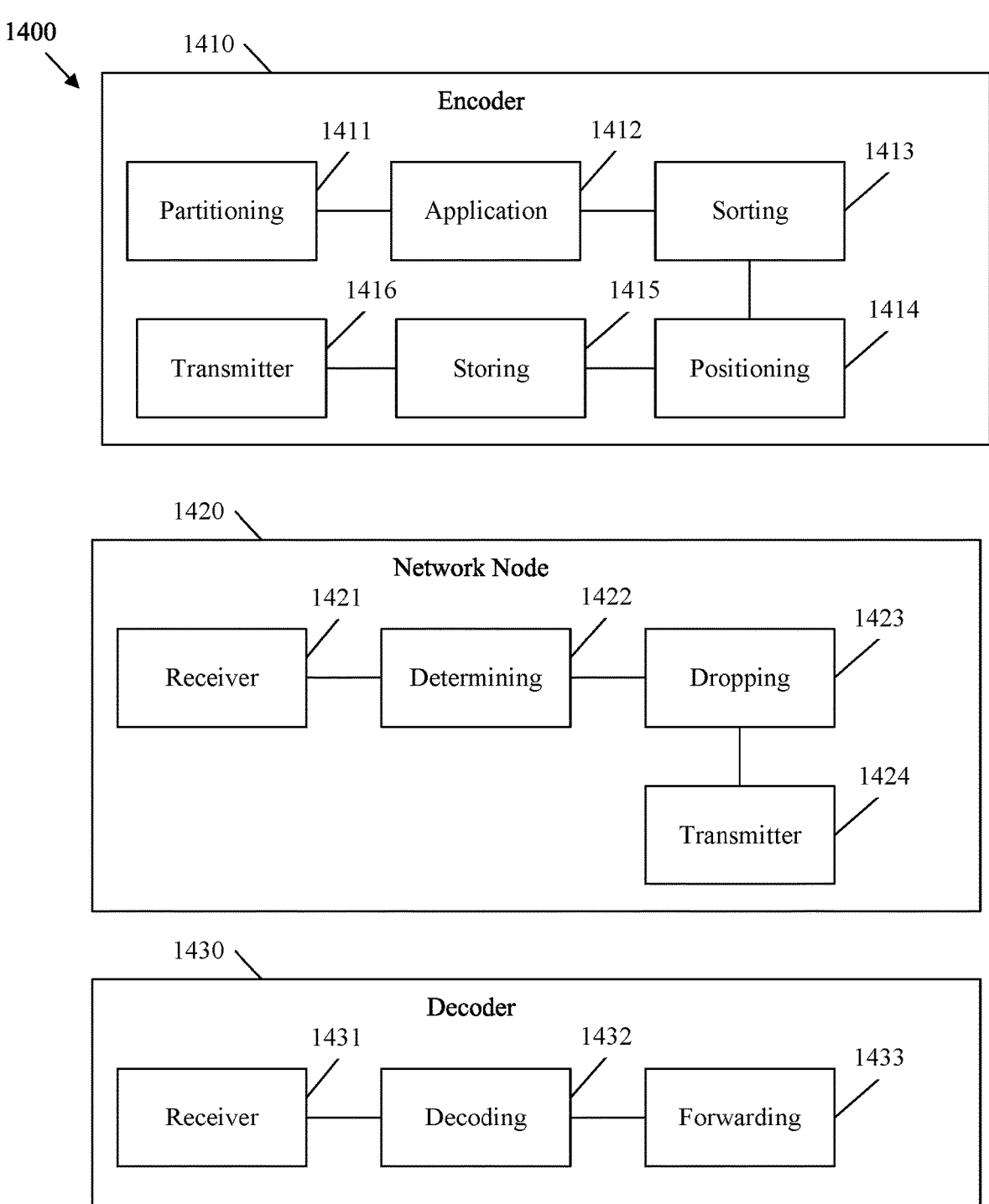
FIG. 14 is a schematic diagram of an example system for applying qualitative communication to a media data packet.

FIG. 14 is a schematic diagram of an example system 1400 for applying qualitative communication to a media data packet, for example according to packet wash 200, mechanism 500, and/or method 900, 1000, 1100, 1200, and/or 1300, which may employ quantization coefficients 400, a media data 600, and/or a media data packet 700. System 1400 may be implemented by an encoder, a network node, and a decoder such as nodes in network 100, devices in system 300, and/or a media processing device 800.

The system 1400 includes an encoder 1410. The encoder 1410 comprises a partitioning module 1411 for partitioning media data into a plurality of blocks. The encoder 1410 comprises an application module 1412 for applying a trans-
form to the blocks to obtain a plurality of quantization
coefficients. The encoder 1410 comprises a sorting module
1413 for sorting the quantization coefficients into quality
layers of decreasing priority based on frequency, wherein
each subsequent layer includes data to incrementally
increase quality of a reconstructed image. The encoder 1410
comprises a positioning module 1414 for positioning quan-
tization coefficients for all blocks in a media data packet
according to quality layer in order of decreasing priority.
The encoder 1410 comprises a storing module 1415 for
storing the media data packet. The encoder 1410 further
comprises a transmitter 1416 for transmitting the media data
packet toward a decoder 1430 via a network node 1420. The
encoder 1410 may be further configured to perform any of
the steps of method 900 and/or 1100.

The system 1400 includes a network node 1420. The
network node 1420 comprises a receiver 1421 for receiving
a media data packet for media data containing a plurality of
blocks, the media data packet comprising quantization coef-
ficients for all blocks, wherein the quantization coefficients
are positioned in quality layers of decreasing priority based
on frequency, and wherein each subsequent layer includes
data to incrementally increase quality of a reconstructed
image. The network node 1420 further comprises a deter-
mining module 1422 for determining a loss tolerance lower
bound from the media data packet. The determining module
1422 is further for determining an outgoing buffer availabil-
ity. The network node 1420 further comprises a dropping
module 1423 for incrementally dropping each least signifi-
cant quality layer of the media data packet until the outgoing
buffer availability is reached. The network node 1420 further
comprises a transmitter 1424 for transmitting the media data
packet toward a decoder 1430 when the loss tolerance lower
bound is met. The network node 1420 may be further
configured to perform any of the steps of method 1200.

The system 1400 includes a decoder 1430. The decoder
1430 comprises a receiver 1431 for receiving a media data
packet for media data containing a plurality of blocks,
wherein the media data is coded as quantization coefficients
corresponding to a transform, and wherein quantization
coefficients for all blocks are positioned in the media data
packet in quality layers of decreasing priority based on
frequency, and wherein each subsequent layer includes data
to incrementally increase quality of a reconstructed media
data. The decoder 1430 further comprises a decoding mod-
ule 1432 for iteratively decoding each block from quanti-
zation coefficients in order of most significant quality layer
to least significant quality layer via an inverse transform.
The decoding module 1432 is further for combining the
blocks to reconstruct the media data. The decoder 1430
further comprises a forwarding module 1433 for forwarding
the media for display/playback. The decoder 1430 may be
further configured to perform any of the steps of method
1000 and/or 1300. The encoder 1410, network node 1420,
and the decoder 1420 are operatively coupled to each other
in a manner sufficient to facilitate the embodiments dis-
closed herein.

A first component is directly coupled to a second com-
ponent when there are no intervening components, except
for a line, a trace, or another medium between the first
component and the second component. The first component
is indirectly coupled to the second component when there
are intervening components other than a line, a trace, or
another medium between the first component and the second
component. The term "coupled" and its variants include both
directly coupled and indirectly coupled. The use of the term "about" means a range including ±10% of the subsequent
number unless otherwise stated.

It should also be understood that the steps of the exem-
plary methods set forth herein are not necessarily required to
be performed in the order described, and the order of the
steps of such methods should be understood to be merely
exemplary. Likewise, additional steps may be included in
such methods, and certain steps may be omitted or com-
bined, in methods consistent with various embodiments of
the present disclosure.

While several embodiments have been provided in the
present disclosure, it may be understood that the disclosed
systems and methods might be embodied in many other
specific forms without departing from the spirit or scope of
the present disclosure. The present examples are to be
considered as illustrative and not restrictive, and the inten-
tion is not to be limited to the details given herein. For
example, the various elements or components may be com-
bined or integrated in another system or certain features may
be omitted, or not implemented.

In addition, techniques, systems, subsystems, and meth-
ods described and illustrated in the various embodiments as
discrete or separate may be combined or integrated with
other systems, components, techniques, or methods without
departing from the scope of the present disclosure. Other
examples of changes, substitutions, and alterations are ascer-
tainable by one skilled in the art and may be made without
departing from the spirit and scope disclosed herein.

What is claimed is:

1. A method implemented by an encoder, the method
comprising:
    partitioning media data into a plurality of blocks;
    applying a transform to the blocks to obtain a plurality of
        quantization coefficients;
    sorting the quantization coefficients into quality layers of
        decreasing priority based on frequency, wherein each
        subsequent layer includes data to incrementally
        increase quality of a reconstructed media data;
    positioning quantization coefficients for all blocks in a
        media data packet by quality layer in order of decreas-
        ing priority; and
    storing the media data packet.

2. The method of claim 1, wherein the quality layers are
positioned to support incremental partial drops of each least
significant quality layer from the media data packet during
transmission while retaining one or more most significant
layers.

3. The method of claim 1, wherein the quantization
coefficients are further sorted into chunks, wherein each
chunk includes all quantization coefficients for a corre-
sponding block at a corresponding quality layer, and
wherein chunks corresponding to a plurality of blocks at a
same quality layer are included in adjacent positions in the
media data packet.

4. The method of claim 1, further comprising positioning
a checksum after each quality layer in the media data packet.

5. The method of claim 1, further comprising positioning
a checksum after each chunk in the media data packet.

6. The method of claim 1, further comprising receiving a
request for the media data, wherein the request includes a
loss tolerance lower bound, and wherein the quantization
coefficients are sorted into quality layers based on the loss
tolerance lower bound or decoder decoding capabilities.

7. The method of claim 1, further comprising encoding
one or more metadata fields in the media data packet,
wherein the metadata fields include a number of blocks in
the media data, a number of quality layers, a size of each layer, a loss tolerance lower bound, a number of remaining layers, or combinations thereof.

8. A method implemented by a decoder, the method comprising:

receiving a media data packet for media data containing a plurality of blocks, wherein the media data is coded as quantization coefficients corresponding to a transform, wherein the quantization coefficients for all blocks are positioned in the media data packet in quality layers of decreasing priority based on frequency, and wherein each subsequent layer includes data to incrementally increase quality of a reconstructed media data;

iteratively decoding each block from the quantization coefficients in order of most significant quality layer to least significant quality layer via an inverse transform; and combining the blocks to reconstruct the media data.

9. The method of claim 8, wherein the quality layers are positioned to support incremental partial drops of each least significant quality layer from the media data packet during transmission while retaining one or more most significant layers.

10. The method of claim 8, wherein the quantization coefficients are further sorted into chunks, wherein each chunk includes all quantization coefficients for a corresponding block at a corresponding quality layer, and wherein chunks corresponding to a plurality of blocks at a same quality layer are included in adjacent positions in the media data packet.

11. The method of claim 8, wherein a checksum is positioned after each quality layer in the media data packet.

12. The method of claim 8, wherein a checksum is positioned after each chunk in the media data packet.

13. The method of claim 8, further comprising transmitting a request for the media data prior to receiving the media data packet, wherein the request includes a loss tolerance lower bound, and wherein the quantization coefficients are sorted into quality layers in the media data packet based on the loss tolerance lower bound in the request.

14. The method of claim 8, wherein the media data packet includes one or more metadata fields, wherein the metadata fields include a number of blocks in the media data, a number of quality layers, a size of each layer, a loss tolerance lower bound, a number of remaining layers, or combinations thereof, and wherein each block is iteratively decoded based on data in the metadata fields.

15. A method implemented by a network node, the method comprising:

receiving a media data packet for media data containing a plurality of blocks, the media data packet comprising quantization coefficients for all blocks, wherein the quantization coefficients are positioned in quality layers of decreasing priority based on frequency, and wherein each subsequent layer includes data to incrementally increase quality of a reconstructed media data;

determining a loss tolerance lower bound from the media data packet;

determining an outgoing buffer availability;

incrementally dropping each least significant quality layer of the media data packet until the outgoing buffer availability is reached; and transmitting the media data packet when the loss tolerance lower bound is met.

16. The method of claim 15, wherein incrementally dropping each least significant quality layer includes removing quantization coefficients from an end of a payload of the media data packet.

17. The method of claim 15, wherein the quantization coefficients are sorted into chunks, wherein each chunk includes all quantization coefficients for a corresponding block at a corresponding quality layer, and wherein chunks corresponding to a plurality of blocks at a same quality layer are included in adjacent positions in the media data packet.

18. The method of claim 15, wherein a checksum is positioned after each quality layer in the media data packet, and wherein incrementally dropping each least significant quality layer includes incrementally dropping each last quality layer in the media data packet until the outgoing buffer availability is reached.

19. The method of claim 15, wherein a checksum is positioned after each chunk in the media data packet, and wherein incrementally dropping each least significant quality layer includes incrementally dropping each last chunk in the media data packet until the outgoing buffer availability is reached.

20. The method of claim 15, wherein the media data packet includes one or more metadata fields including a number of remaining layers, and further comprising decrementing the number of remaining layers each time a quality layer is dropped, and wherein the metadata fields further include a number of blocks in the media data, a number of quality layers, a size of each layer, the loss tolerance lower bound, or combinations thereof.

* * * * *